United States Patent
Kang et al.

(10) Patent No.: US 7,435,402 B2
(45) Date of Patent: Oct. 14, 2008

(54) METHOD AND APPARATUS FOR PREPARATION OF SPHERICAL METAL CARBONATES AND LITHIUM METAL OXIDES FOR LITHIUM RECHARGEABLE BATTERIES

(75) Inventors: Sun-Ho Kang, Naperville, IL (US); Khalil Amine, Downers Grove, IL (US)

(73) Assignee: U Chicago Argonne LLC, Chicago, IL (US)

( * ) Notice: Subject to any disclaimer, the term of this patent is extended or adjusted under 35 U.S.C. 154(b) by 865 days.

(21) Appl. No.: 10/903,514

(22) Filed: Jul. 30, 2004

(65) Prior Publication Data

US 2005/0058588 A1  Mar. 17, 2005

Related U.S. Application Data

(63) Continuation-in-part of application No. 10/699,484, filed on Oct. 31, 2003, now Pat. No. 7,205,072.

(60) Provisional application No. 60/423,347, filed on Nov. 1, 2002.

(51) Int. Cl.
*C01B 31/24* (2006.01)

(52) U.S. Cl. ............ 423/420.2; 252/518.1; 252/519.12; 252/519.14; 252/519.15; 429/223

(58) Field of Classification Search .............. 423/420.2; 429/223; 252/518.1, 519.12, 519.14, 519.15
See application file for complete search history.

(56) References Cited

U.S. PATENT DOCUMENTS 6,677,082 B2  1/2004  Thackeray et al.

6,680,143 B2  1/2004  Thackeray et al.

OTHER PUBLICATIONS

Ohzuku et al., "Layered Lithium Insertion Material of LiNi½Mn½O₂: A Possible Alternative to LiCoO₂ for Advanced Lithium-Ion Batteries", Chemistry Letters, 2001, pp. 744-745, The Chemical Society of Japan.

Lu et al., "Layered Cathode Materials Li[Ni$_x$Li$_{(1/3-2x/3)}$Mn$_{(2/3-x/3)}$]O₂ for Lithium-Ion Batteries," Electrochemical and Solid State Letters, 2001, pp. A191-A194, vol. 4 (11), The Electrochemical Society, Inc.

Lu et al., "Understanding the Anomalous Capacity of Li/Li[Ni$_x$Li$_{(1/3-2x/3)}$Mn$_{(2/3-x/3)}$]O₂ Cells Using In Situ X-Ray Diffraction and Electrochemical Studies", Journal of The Electrochemical Society, 2002, pp. A815-A822, vol. 149 (7), The Electrochemical Society, Inc.

Kim et al., "Layered xLiMO₂•(1−x)Li₂M'O₃ Electrodes for Lithium Batteries: A Study of 0.95LiMn$_{0.5}$O₂•0.05Li₂TiO₃", Elsevier Science B.V., 2002, pp. 205-209, vol. 4, Electrochemistry Communications.

*Primary Examiner*—Stuart Hendrickson
(74) *Attorney, Agent, or Firm*—Foley & Lardner LLP

(57) ABSTRACT

A number of materials with the composition $Li_{1+x}Ni_\alpha Mn_\beta Co_\gamma M'_\delta O_{2-z}F_z$ (M'=Mg,Zn,Al,Ga,B,Zr,Ti) for use with rechargeable batteries, wherein x is between about 0 and 0.3, α is between about 0.2 and 0.6, β is between about 0.2 and 0.6, γ is between about 0 and 0.3, δ is between about 0 and 0.15, and z is between about 0 and 0.2. Adding the above metal and fluorine dopants affects capacity, impedance, and stability of the layered oxide structure during electrochemical cycling. Another aspect of the invention includes materials with the composition $Li_{1+x}Ni_\alpha Co_\beta Mn_\gamma M'_\delta O_y F_z$ (M'=Mg,Zn,Al,Ga,B,Zr,Ti), where the x is between 0 and 0.2, the α between 0 and 1, the β between 0 and 1, the γ between 0 and 2, the δ between about 0 and about 0.2, the y is between 2 and 4, and the z is between 0 and 0.5.

4 Claims, 27 Drawing Sheets

The first charge/discharge curves of $Li(Ni_\alpha Mn_\beta Co_\gamma)O_{2-z}F_z$.
(a) $\alpha=0.5, \beta=0.5, \gamma=0, z=0$; (b) $\alpha=0.505, \beta=0.495, \gamma=0, z=0.01$;
(c) $\alpha=0.51, \beta=0.49, \gamma=0, z=0.02$; (d) $\alpha=0.41, \beta=0.39, \gamma=0.2, z=0.02$ Vairation of discharge capacity with cycling number of $Li(Ni_\alpha Mn_\beta Co_\gamma)O_{2-z}F_z$.

Area specific impedance (ASI) as a function of state of charge (SOC) of Li(Ni$_\alpha$Mn$_\beta$)O$_{2-z}$F$_z$.

Variation of ASI at 50% SOC of $Li(Ni_\alpha Mn_\beta)O_{2-z}F_z$.
(a) $\alpha=0.5$, $\beta=0.5$, $z=0$; (b) $\alpha=0.505$, $\beta=0.495$, $z=0.01$
(c) $\alpha=0.51$, $\beta=0.49$, $z=0.02$; (d) $\alpha=0.525$, $\beta=0.475$, $z=0.05$ Variation of discharge capacity with cycling of Li/ Li(Ni$_\alpha$Mn$_\beta$Co$_\gamma$)O$_2$ cells at room temperature.

(a) α=0.4, β=0.4, γ=0.2, uncoated;
(b) α=0.4, β=0.4, γ=0.2, coated with 0.5wt% Al-isopropoxide;
(c) α=0.4, β=0.4, γ=0.2, coated with 1.0wt% Al-isopropoxide.

Variation of discharge capacity with cycling of Li/ Li(Ni$_\alpha$Mn$_\beta$Co$_\gamma$)O$_2$ cells at 55°C.
(a) α=0.4, β=0.4, γ=0.2, uncoated;
(b) α=0.4, β=0.4, γ=0.2, coated with 0.5wt% Al-isopropoxide.

Variation of area specific impedance (ASI) with cycling measured with C/ Li(Ni$_\alpha$Mn$_\beta$Co$_\gamma$)O$_2$ cells.

(a) $\alpha$=0.4, $\beta$=0.4, $\gamma$=0.2, uncoated;
(b) $\alpha$=0.4, $\beta$=0.4, $\gamma$=0.2, coated with 0.5wt% Al-isopropoxide;
(c) $\alpha$=0.4, $\beta$=0.4, $\gamma$=0.2, coated with 1.0wt% Al-isopropoxide.

Variation of a.c. impedance with cycling measured with C/ Li(Ni$_\alpha$Mn$_\beta$Co$_\gamma$)O$_2$ cells.

(a) $\alpha$=0.4, $\beta$=0.4, $\gamma$=0.2, uncoated;
(b) $\alpha$=0.4, $\beta$=0.4, $\gamma$=0.2, coated with 0.5wt% Al-isopropoxide;
(c) $\alpha$=0.4, $\beta$=0.4, $\gamma$=0.2, coated with 1.0wt% Al-isopropoxide.

Variation of area specific impedance at 60% SOC with 55°C-storage time measured with C/ Li(Ni$_\alpha$Mn$_\beta$Co$_\gamma$)O$_2$ cells.
(a) $\alpha$=0.4, $\beta$=0.4, $\gamma$=0.2, uncoated;
(b) $\alpha$=0.4, $\beta$=0.4, $\gamma$=0.2, coated with 0.5wt% Al-isopropoxide;
(c) $\alpha$=0.4, $\beta$=0.4, $\gamma$=0.2, coated with 1.0wt% Al-isopropoxide.

The first charge/discharge curves (A) and cycling performance (B) of Li/Li$_{1+x}$(Ni$_\alpha$Mn$_\beta$Co$_\gamma$)O$_2$ cells.
(a) x=0.2, α=0.2, β=0.6, γ=0;
(b) x=0.2, α=0.195, β=0.595, γ=0.01;
(c) x=0.2, α=0.175, β=0.575, γ=0.05;
(d) x=0.2, α=0.15, β=0.55, γ=0.10.

The area specific impedance as a function of state of charge of $C/Li_{1+x}(Ni_\alpha Mn_\beta Co_\gamma)O_2$ cells.
(a) $x=0.2$, $\alpha=0.2$, $\beta=0.6$, $\gamma=0$;
(b) $x=0.2$, $\alpha=0.195$, $\beta=0.595$, $\gamma=0.01$;
(c) $x=0.2$, $\alpha=0.175$, $\beta=0.575$, $\gamma=0.05$;
(d) $x=0.2$, $\alpha=0.15$, $\beta=0.55$, $\gamma=0.10$.

Cycling performance of Li/Li$_{1+x}$(Ni$_\alpha$Mn$_\beta$Co$_\gamma$)O$_{2-z}$F$_z$ cells at room tempearture (A) and at 55°C (B).
(a) —○— x=0.2, α=0.15, β=0.55, γ=0.1, z=0;
(b) —□— x=0.2, α=0.16, β=0.54, γ=0.1, z=0.02;
(c) —△— x=0.2, α=0.175, β=0.525, γ=0.1, z=0.05;
(d) —▽— x=0.2, α=0.2, β=0.5, γ=0.1, z=0.1.

The area specific impedance of
$C/Li_{1+x}(Ni_\alpha Mn_\beta Co_\gamma)O_{2-z}F_z$ cells as a function of SOC.
—○— $x=0.2, \alpha=0.15, \beta=0.55, \gamma=0.1, z=0$;
—□— $x=0.2, \alpha=0.16, \beta=0.54, \gamma=0.1, z=0.02$;
—△— $x=0.2, \alpha=0.175, \beta=0.525, \gamma=0.1, z=0.05$.

XRD patterns of $(Ni_{1/3}Co_{1/3}Mn_{1/3})CO_3$ and $MnCO_3$ precipitates.

The XRD pattern of the Li[Ni$_{1/3}$Co$_{1/3}$Mn$_{1/3}$]O$_2$ material synthesized at 1000°C, for 10h in air using the spherical (Ni$_{1/3}$Co$_{1/3}$Mn$_{1/3}$)CO$_3$ precursor.

The first charge/discharge curves of the Li/Li[Ni$_{1/3}$Co$_{1/3}$Mn$_{1/3}$]O$_2$ cells (a), and the variations of the discharge capacities with cycle number.

METHOD AND APPARATUS FOR PREPARATION OF SPHERICAL METAL CARBONATES AND LITHIUM METAL OXIDES FOR LITHIUM RECHARGEABLE BATTERIES

CROSS-REFERENCE TO RELATED PATENT APPLICATIONS

This application is a continuation in part of and claims priority to U.S. patent application Ser. No. 10/699,484, titled "Layered Cathode materials for Lithium Ion Rechargeable Batteries", filed on Oct. 31, 2003, and incorporated herein by reference in its entirety, which claims priority to U.S. Provisional Patent Application No. 60/423,347, filed Nov. 1, 2002, also incorporated herein by reference in its entirety.

This invention was made with government support under Contract No. W-31-109-ENG-38 awarded to the Department of Energy. The Government has certain rights in this invention.

BACKGROUND OF THE INVENTION

Rechargeable lithium batteries have become widely used in both consumer and industrial applications. Rechargeable lithium batteries have a higher volumetric and gravimetric energy densities than other rechargeable batteries such as nickel metal hydride (NiMH) batteries and Ni—Cd batteries. Furthermore, the rechargeable lithium batteries have no memory effects and do not contain any poisonous metal elements such as mercury, lead, and cadmium. The applications of lithium batteries encompass a wide range of applications including small portable electronics such as notebook computers and personal digital assistants to electric vehicles and satellites.

$Li(Mn_{0.5}Ni_{0.5})O_2$ is a promising cathode material for Li-ion rechargeable batteries due to its lower cost, improved thermal safety performance, and lower toxicity compared with $LiNiO_2$ and $LiCoO_2$. However, $Li(Mn_{0.5}Ni_{0.5})O_2$ exhibits rather small capacity for high-energy applications and rather high impedance for high-power applications.

In addition to new types of cathode materials, various changes in the uses of lithium batteries have brought focus upon the energy density and packing density of the batteries. To achieve the high packing density of the cathode composite, spherical cathode particles with a narrow size distribution are desired. Furthermore, since a sphere has the smallest surface area among other morphology with the same volume, it is believed that thermal safety is increased with the use of spherical particles by way of reducing the contact areas between the cathode materials and liquid electrolyte.

A need therefore remains for an improved layered cathode material for use with lithium ion rechargeable batteries.

SUMMARY OF THE INVENTION

It is therefore an object of the present invention to provide an improved cathode for rechargeable batteries that possesses improved impedance characteristics.

It is another object of the present invention to provide an improved cathode for rechargeable batteries that possesses improved stability of the layered oxide structure during electrochemical cycling.

It is another object of the present invention to provide an improved cathode for rechargeable batteries that possesses improved packing density and thermal safety.

It is still another object of the present invention to provide an improved cathode for rechargeable batteries that possesses improved capacity characteristics.

In accordance with the above objects, a number of materials with composition $Li_{1+x}Ni_\alpha Mn_\beta Co_\gamma M'_\delta O_{2-z}F_z$ (M'=Mg, Zn,Al,Ga,B,Zr,Ti) have been developed for use with rechargeable batteries, wherein x is between 0 and about 0.3, α is between about 0.2 and about 0.6, β is between about 0.2 and about 0.6, γ is between 0 and about 0.3, δ is between 0 and about 0.15, and z is between 0 and about 0.2. Surface-coated $Li_{1+x}Ni_\alpha Mn_\beta Co_\gamma M'_\delta O_{2-z}F_z$ (M'=Mg,Zn,Al,Ga,B,Zr,Ti) has also been developed, wherein x is between 0 and about 0.3, α is between about 0.2 and about 0.6, β is between about 0.2 and about 0.6, γ is between 0 and about 0.3, δ is between 0 and about 0.15, and z is between 0 and about 0.2. Extensive testing has been conducted to investigate the effect of adding the above metal and fluorine dopants and the surface modification on capacity, impedance, and stability of the layered oxide structure during electrochemical cycling.

Further, in accordance with the above objects, a number of spherical metal carbonates have been developed with a narrow size distribution and with a composition of $(Ni_a Co_b Mn_c)CO_3$, where the a is between 0 and about 1, the b between 0 and about 1, and the c between 0 and about 1. Extensive testing was conducted to investigate the effect of various experimental factors—concentration of metal solutions, concentration of precipitating agent solutions, reaction temperature, and aging time—on the size and morphology of the precipitates. Spherical lithium metal oxides were synthesized by using the spherical metal carbonates. The composition of the spherical lithium metal oxides thus synthesized is $Li_{1+x}Ni_\alpha Co_\beta Mn_\gamma M'_\delta O_y F_z$ (M'=Mg,Zn,Al,Ga,B, Zr,Ti), where the x is between 0 and about 0.2, the α between 0 and about 1, the β between 0 and about 1, the γ between 0 and about 2, the δ between 0 and about 0.2, the y is between about 2 and about 4, and the z is between 0 and about 0.5.

DETAILED DESCRIPTION OF THE PREFERRED EMBODIMENTS

Figure 1A:
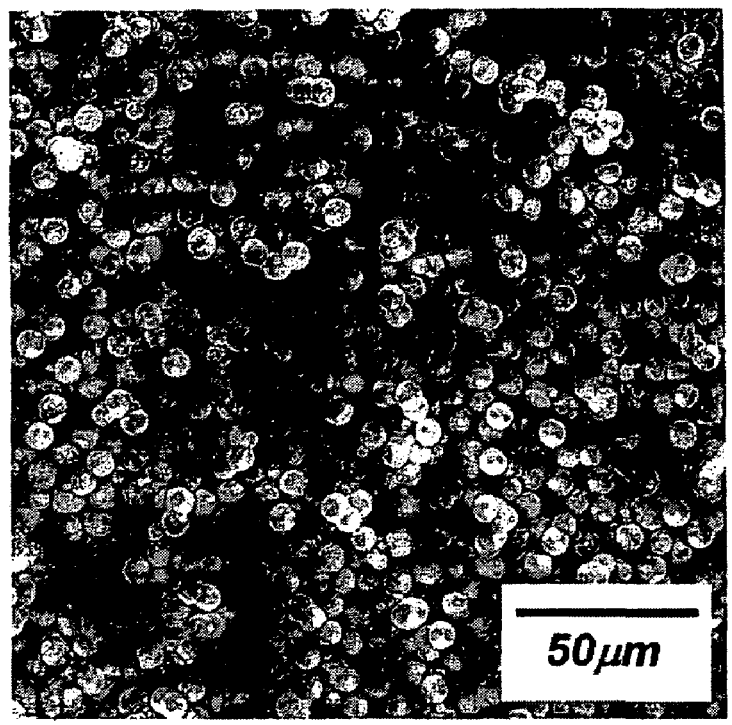
FIGS. 1(a)-1(c) show the morphology of $(Ni_\alpha Mn_\beta Co_\gamma)$-carbonate prepared by a co-precipitation method using ammonium hydrogen carbonate using magnification factors of ×500, ×2,000, and ×12,000, respectively.

The present invention presents layered lithium nickel manganese oxide cathode materials for lithium secondary batteries such as: (1) cathode materials doped with fluorine on oxygen sites to reduce impedance and to improve cycling stability at high temperature as well as at room temperature; (2) cathode materials doped with various metal ions on transition metal site to stabilize layered structure, suppress cation mixing and, consequently, improve electrochemical properties; lithium, cobalt, magnesium, zinc, aluminum, gallium, boron, zirconium, and titanium ions were chosen for the latter purposes; and (3) cathode materials surface-coated to improve cycling/power performance and thermal safety, wherein the coating element of the coating material source is at least one element selected from the group consisting of Al, Bi, Ga, Ge, In, Mg, Pb, Si, Sn, Ti, Tl, Zn, Zr. Another aspect of the present invention relates to a method of preparing: 1) spherical mixed nickel-cobalt-manganese carbonates with a narrow size distribution, and 2) spherical lithium nickel cobalt manganese oxide using the spherical carbonate precursors.

Either a solid-state reaction method or an aqueous solution method or a sol-gel method may be employed for the preparation of the compounds Li$_{1+x}$Ni$_\alpha$Mn$_\beta$Co$_\gamma$M'$_\delta$O$_{2-z}$F$_z$ with the value M'=Mg,Zn,Al,Ga,B,Zr,Ti.

For the solid state reaction method, (Ni,Mn,Co)-hydroxides or (Ni, Mn,Co)-carbonates may be prepared by a co-precipitation method. For preparation of (Ni,Mn,Co)-hydroxides, appropriate amount of NiSO$_4$ [or Ni(CH$_3$COO)$_2$.xH$_2$O or Ni(NO$_3$)$_2$.xH$_2$O], MnSO$_4$ [or Mn(CH$_3$COO)$_2$.xH$_2$O or Mn(NO$_3$)$_2$.xH$_2$O, and CoSO$_4$ [or Co(CH$_3$COO)$_2$.xH$_2$O or Co(NO$_3$)$_2$.xH$_2$O] are dissolved in distilled water, and the solution is added to another solution of ammonium hydroxide (NH$_4$OH) and sodium hydroxide (NaOH) with a pH=10~12. During the co-precipitation process, the pH of the overall solution is kept at 10~12 using NaOH. For preparation of (Ni,Mn,Co)-carbonates, appropriate amount of NiSO$_4$ [or Ni(CH$_3$COO)$_2$.xH$_2$O or Ni (NO$_3$)$_2$.xH$_2$O], MnSO$_4$ [or Mn(CH$_3$COO)$_2$.xH$_2$O or Mn(NO$_3$)$_2$.xH$_2$O], and CoSO$_4$ [or Co(CH$_3$COO)$_2$.xH$_2$O or Co(NO$_3$)$_2$.xH$_2$O] are dissolved in distilled water, and the solution is added to another aqueous solution of ammonium hydrogen carbonate [(NH$_4$)$_4$HCO$_3$] or sodium carbonate (Na$_2$CO$_3$). During the co-precipitation process, the temperature of the overall solution is kept at 40-70° C. The co-precipitated powders are filtered and dried. To prepare a Li$_{1+x}$Ni$_\alpha$Mn$_\beta$Co$_\gamma$M'$_\delta$O$_{2-z}$F$_z$ (M'=Mg,Zn,Al,Ga,B,Zr,Ti) compound, appropriate amounts of lithium hydroxide (or lithium carbonate), lithium fluoride, (Ni,Mn,Co)-hydroxide [or (Ni, Mn,Co)-carbonate], and M'-hydroxides (or M'-oxides) are mixed. The mixed powders are calcined at 450~700° C. for 12-30 hours in air and then at 700-1000° C. for 10-24 hours either in air or in an oxygen-containing atmosphere.

For the aqueous solution method, appropriate amounts of lithium hydroxide, lithium fluoride, nickel hydroxide, cobalt hydroxide, and M'-hydroxide (or M'-nitrate) are dissolved in distilled water whose pH is adjusted with nitric acid. An aqueous solution of manganese acetate is added to the above solution. The mixed solution is refluxed in a round bottom flask attached with a condenser at 80° C. for about 12-24 hours and evaporated in a rotary vacuum evaporator. Organic contents in the gel precursor are eliminated at 400° C. for 2 hours. Finally, the resulting powder is calcined at 800-1000° C. for about 10-24 hours either in air or in an oxygen-containing atmosphere.

For the sol-gel method, appropriate amounts of lithium acetate, lithium fluoride, nickel acetate, manganese acetate, cobalt acetate, and M'-acetate are dissolved in distilled water and added to a glycolic/tartaric acid solution that is used as a chelating agent. The solution pH is adjusted to around 7 using ammonium hydroxide. The entire process is conducted under continuous stirring and heating on a hot plate. The resulting gel precursor is decomposed at 450° C. for 5 hours in air. The decomposed powders are then fired at about 800-1000° C. for about 10-24 hours either in air or in an oxygen-containing atmosphere.

For the surface-coating of the synthesized compound $Li_{1+x}Ni_\alpha Mn_\beta Co_\gamma M'_\delta O_{2-z}F_z$, coating solutions are prepared by dissolving coating material sources in organic solvents or water. The coating material sources include A'-alkoxide, A'-salt or A'-oxide, where A' includes Al, Bi, Ga, Ge, In, Mg, Pb, Si, Sn, Ti, Tl, Zn, Zr or mixtures thereof. The coating solutions are mixed with the synthesized compound $Li_{1+x}Ni_\alpha Mn_\beta Co_\gamma M'_\delta O_{2-z}F_z$ by an impregnation method such as dip coating. The amount of coating material sources may be between about 0.05 and 10 weight percent of $Li_{1+x}Ni_\alpha Mn_\beta Co_\gamma M'_\delta O_{2-z}F_z$. Thereafter, the surface-coated $Li_{1+x}Ni_\alpha Mn_\beta Co_\gamma M'_\delta O_{2-z}F_z$ powder is dried at temperatures between about 25° C. and 700° C. for approximately 1 to 24 hours.

The synthesized compound is mixed with a carbon additive and a PVDF binder to form a laminate film on an aluminum foil. This laminate is used for electrochemical testing in the presence of lithium or carbon counter electrodes and non-aqueous electrolytes made of $LiPF_6$/EC:DEC (1:1).

Figure 1B:
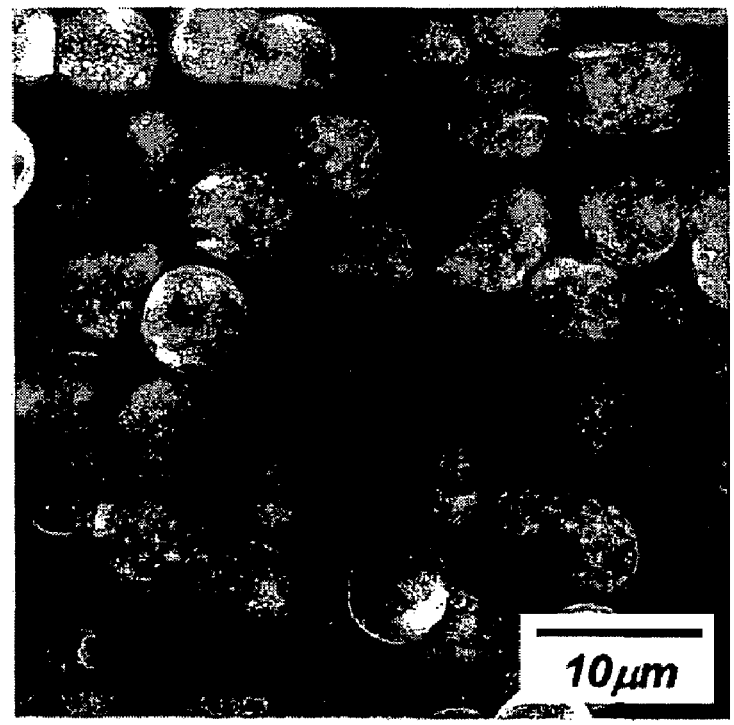
Figure 1C:
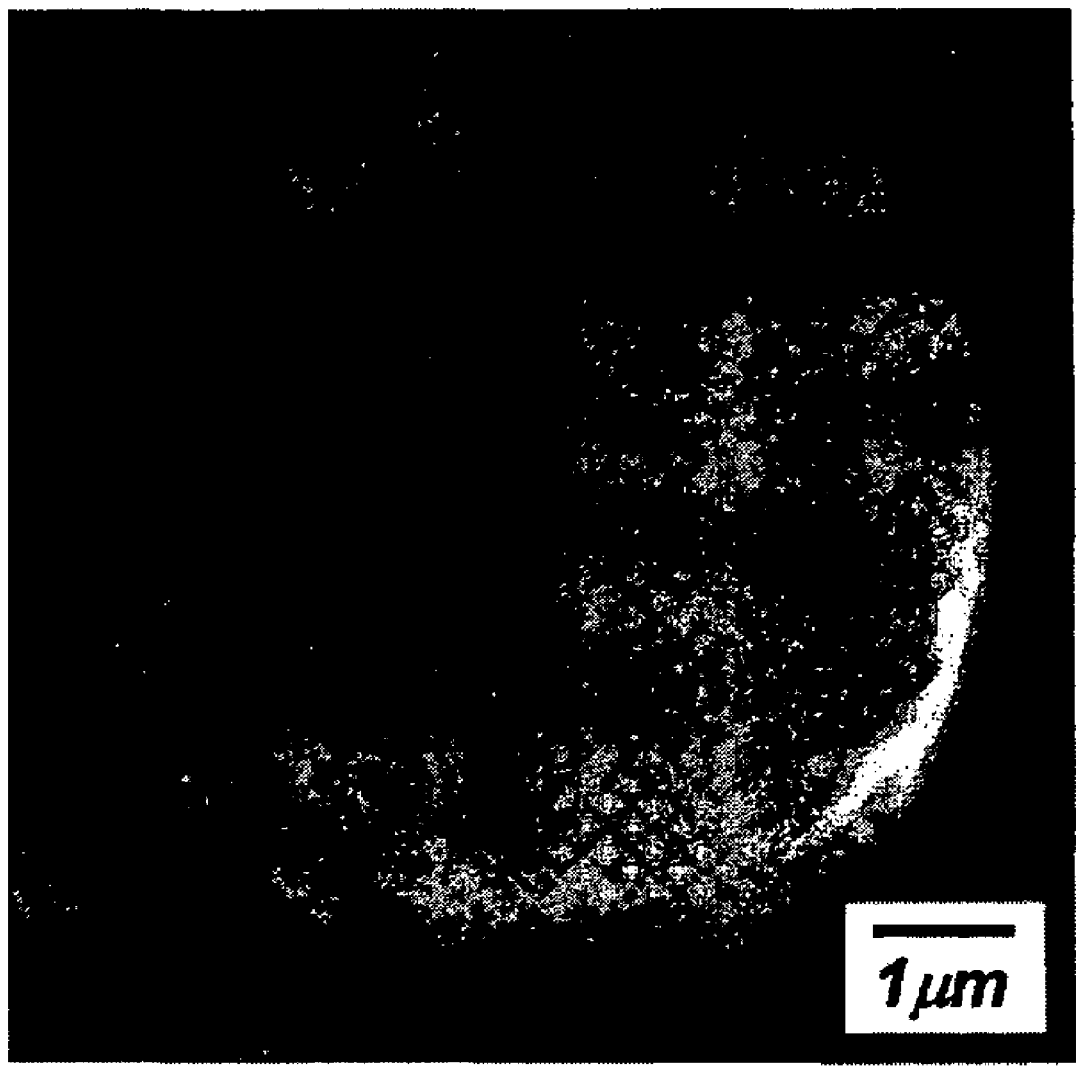

FIGS. 1(a)-1(c) show the morphology of $(Ni_\alpha Mn_\beta Co_\gamma)$-carbonate prepared by the co-precipitation method using ammonium hydrogen carbonate. Spherical shape precursors with homogeneous size distribution are obtained by the co-precipitation. The magnification factors of FIGS. 1(a), 1(b), and 1(c) are ×500, ×2,000, and ×12,000, respectively.

Figure 2A:
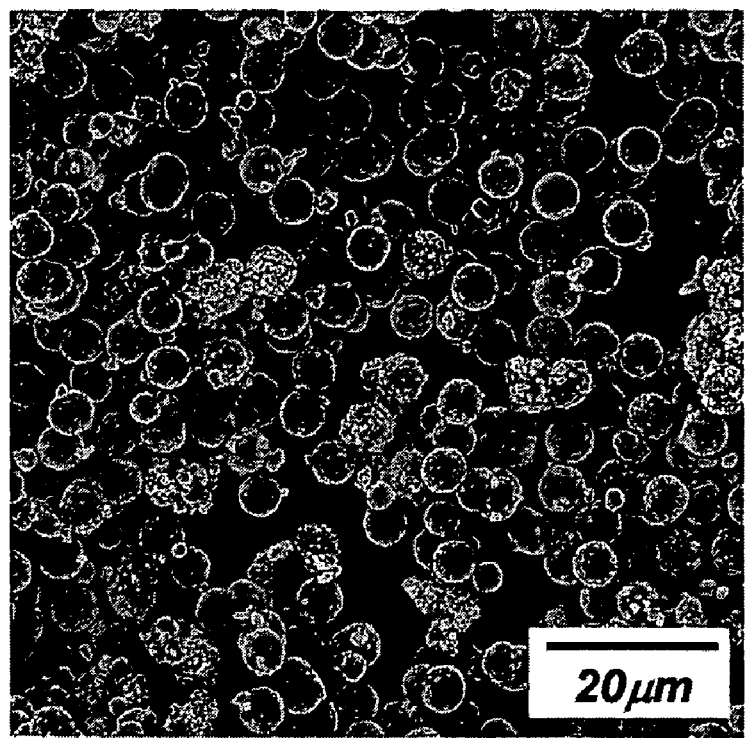
FIGS. 2(a)-2(c) show the morphology of $Li_{1+x}Ni_\alpha Mn_\beta Co_\gamma O_2$ prepared by calcinations of $(Ni_\alpha Mn_\beta Co_\gamma)$-carbonate and lithium carbonate at 1000° C. for 10 h in air, using magnification factors of ×1,000, ×2,000, and ×12,000, respectively.
Figure 2B:
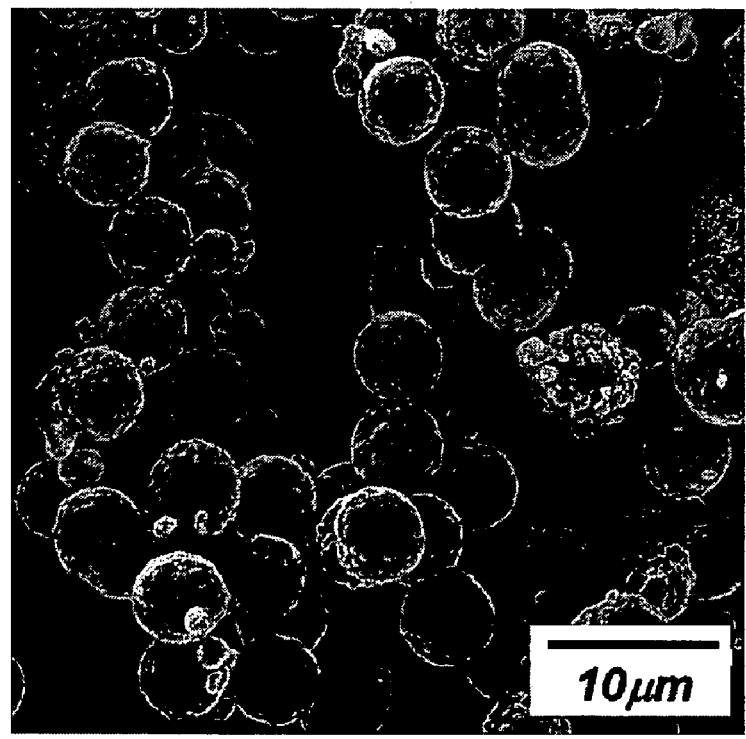
Figure 2C:
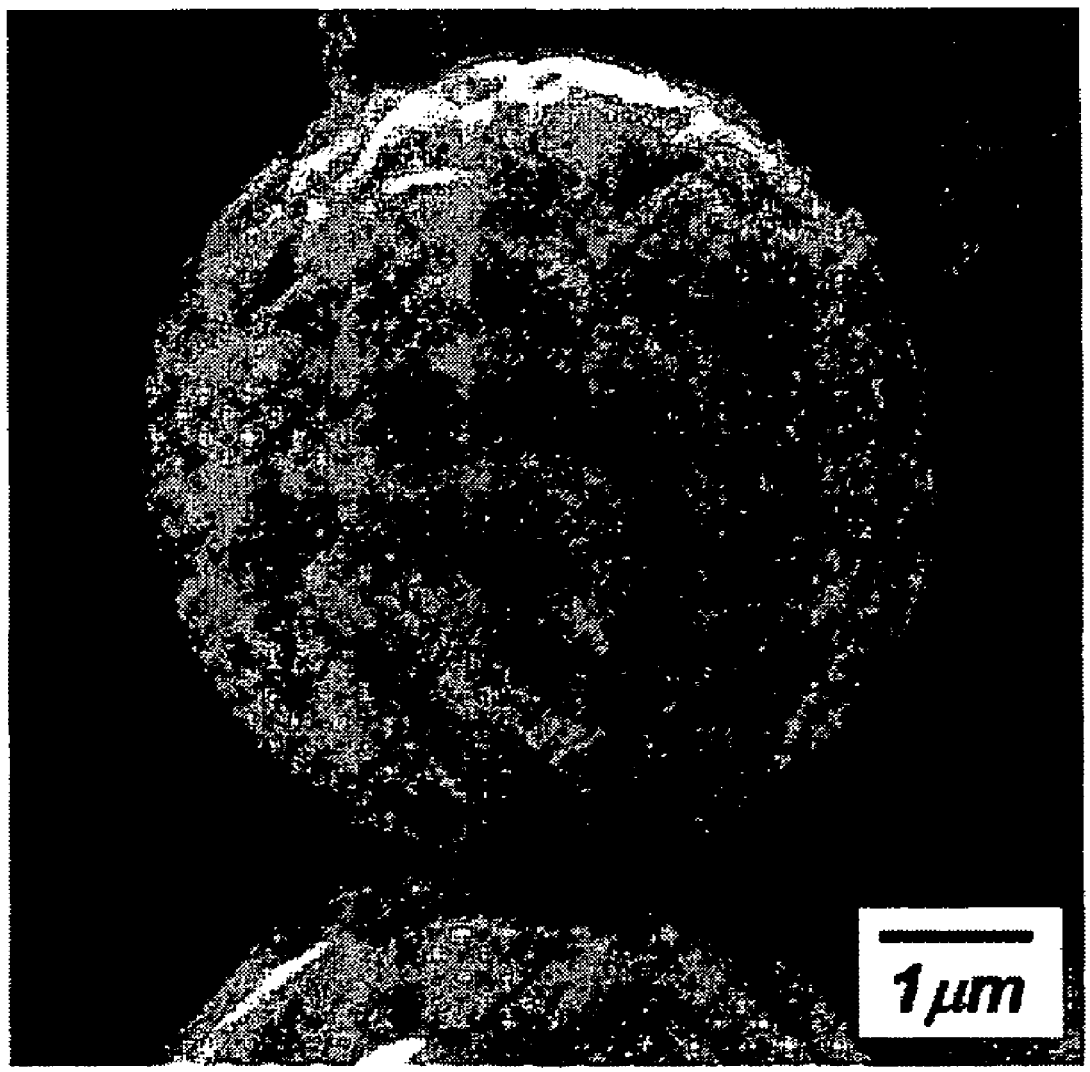

FIGS. 2(a)-2(c) show the morphology of $Li_{1+x}Ni_\alpha Mn_\beta Co_\gamma O_2$ prepared by calcinations of $(Ni_\alpha Mn_\beta Co_\gamma)$-carbonate and lithium carbonate at 1000° C. for 10 h in air. The spherical shape of the precursor is preserved after calcinations. The magnification factors of FIGS. 2(a), 2(b) and 2(c) are ×1,000, ×2,000, and ×12,000, respectively.

Figure 3:
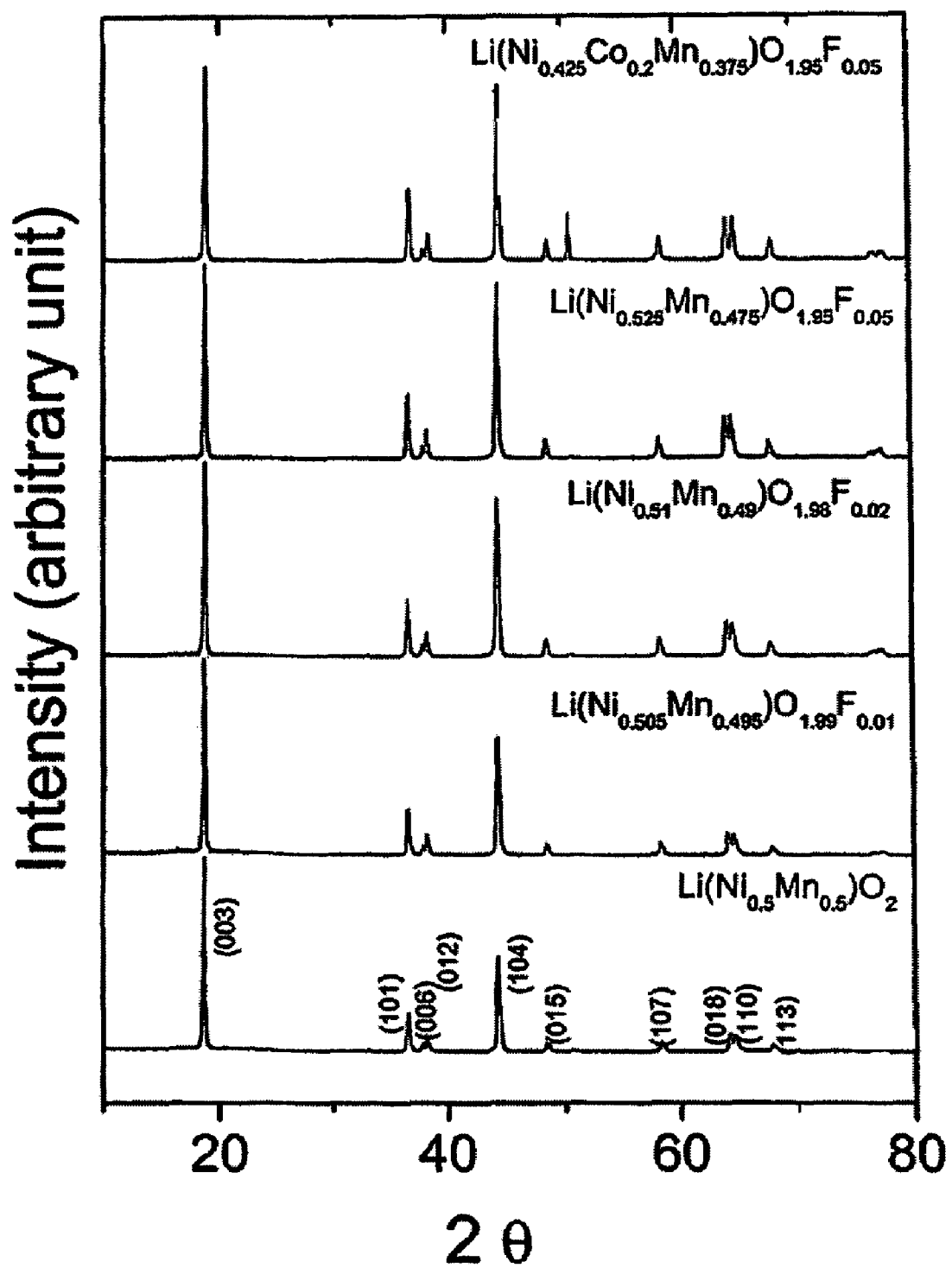
FIG. 3 and FIG. 4 are plots showing the X-ray diffraction patterns of various $Li_{1+x}Ni_\alpha Mn_\beta Co_{65}M'_\delta O_{2-z}F_z$ compounds.
Figure 4:
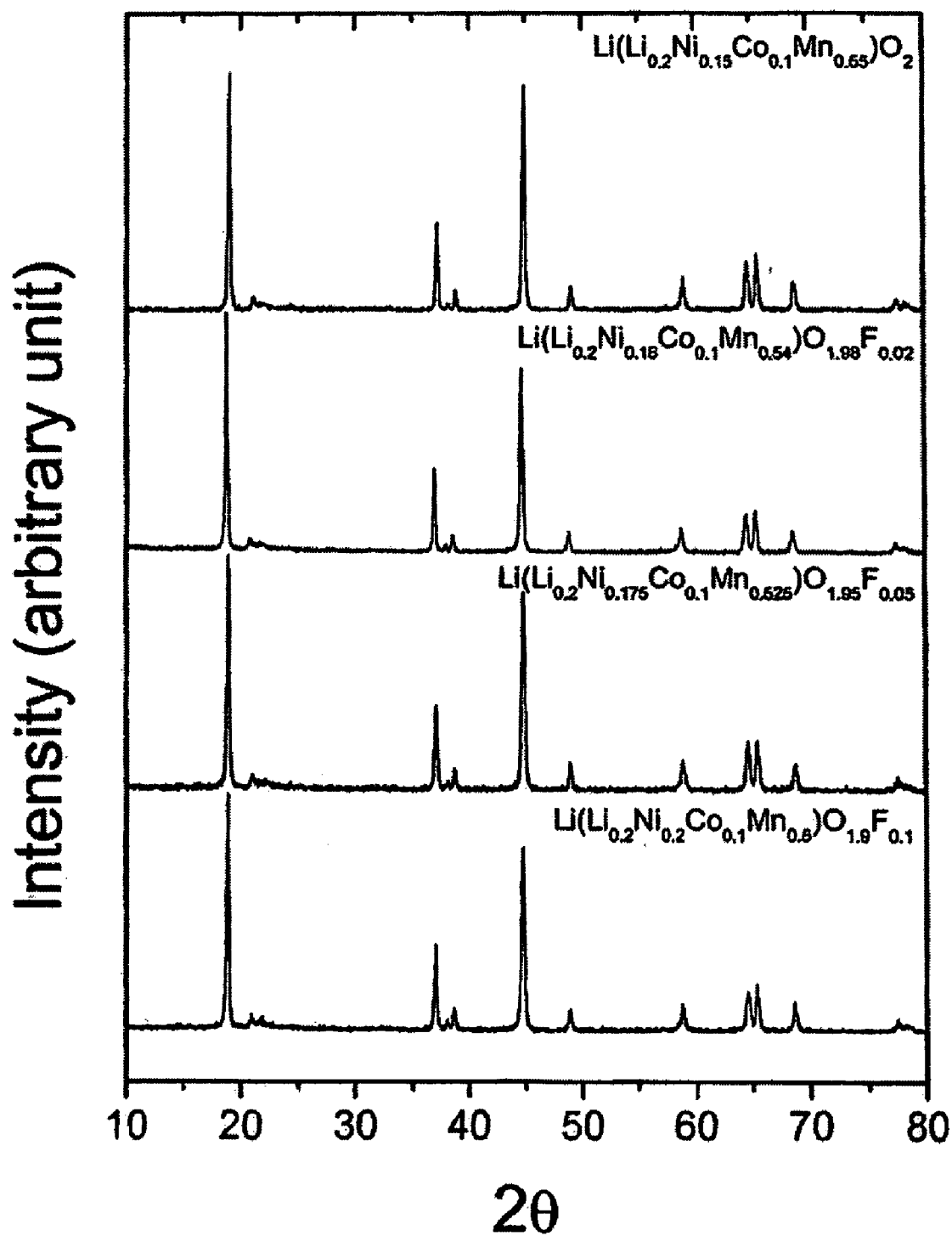

FIGS. 3 and 4 represent X-ray diffraction patterns of $Li_{1+x}Ni_\alpha Mn_\beta Co_\gamma M'_\delta O_{2-z}F_z$ compounds. All of the compounds exhibit the ordered rock-salt structure with crystallographic structure of $R\bar{3}m$. For the Li-excess composition such as $Li(Li_{0.2}Ni_{0.2+0.5z}Co_{0.1}Mn_{0.5-0.5z})O_{2-z}F_z$, extra peaks appear at 20~25°, as shown in FIG. 4, which are generally attributed to cation ordering in the transition metal layer.

Figure 5:
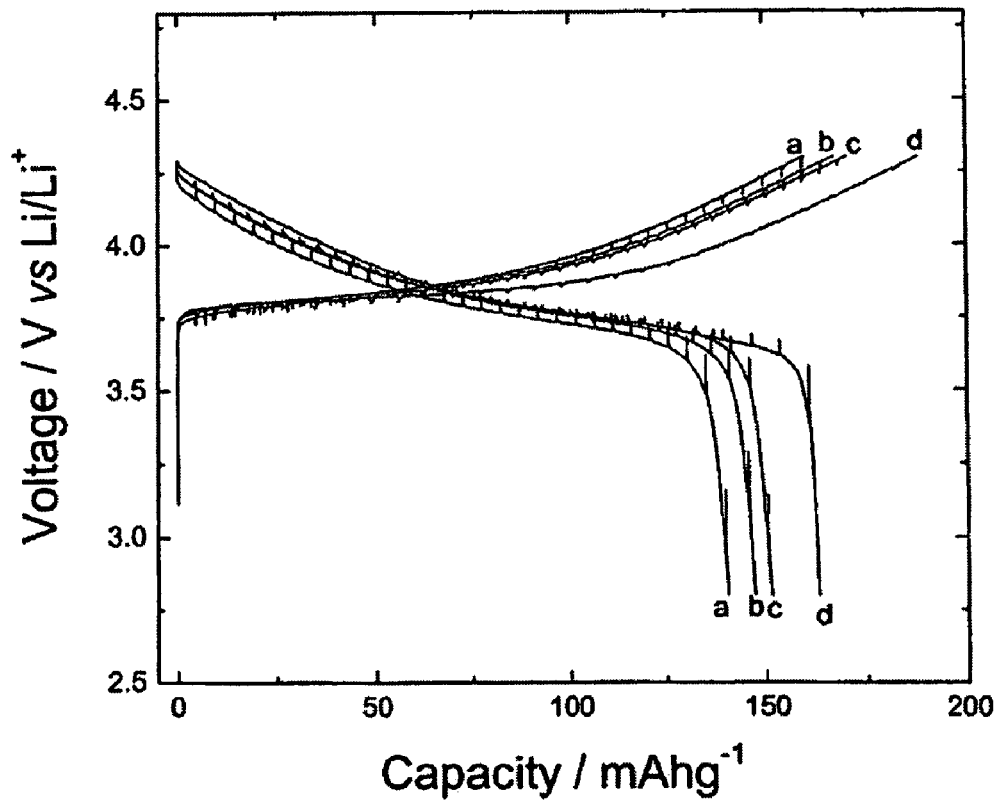
FIG. 5 is a plot showing the first charge/discharge curves of $Li/Li(Ni_\alpha Mn_\beta Co_\gamma)O_{2-z}F_z$ cells.
Figure 6:
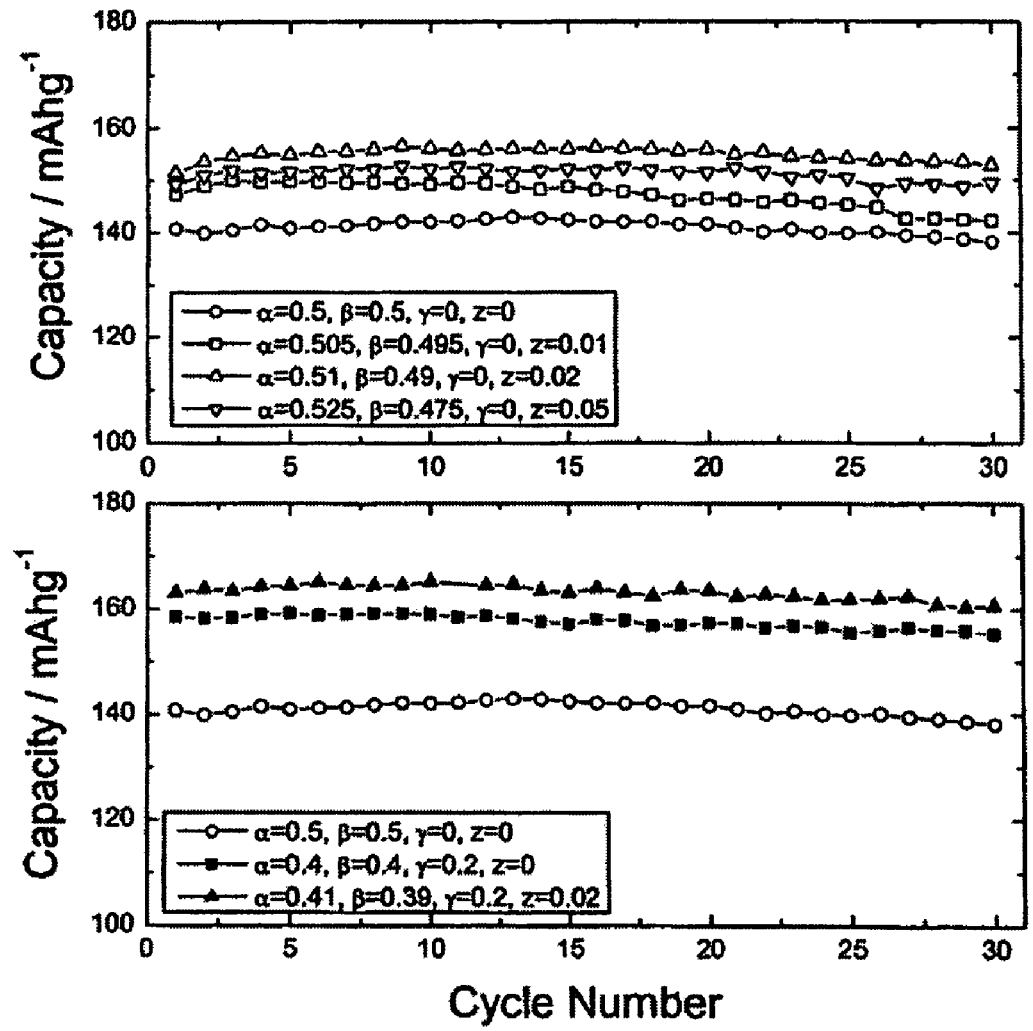
FIG. 6 is a plot showing the cycling performance of $Li/Li(Ni_\alpha Mn_\beta Co_\gamma)O_{2-z}F_z$ cells.

FIG. 5 shows the first charge/discharge curves of $Li/Li(Ni_\alpha Mn_\beta Co_\gamma)O_{2-z}F_z$ cells, and FIG. 6 shows cycling performance of $Li/Li(Ni_\alpha Mn_\beta Co_\gamma)O_{2-z}F_z$ cells. FIGS. 5 and 6 clearly show that the discharge capacity increases by more than 10%, and the cycling performance improves by the simultaneous substitution of cations and anions.

Figure 7:
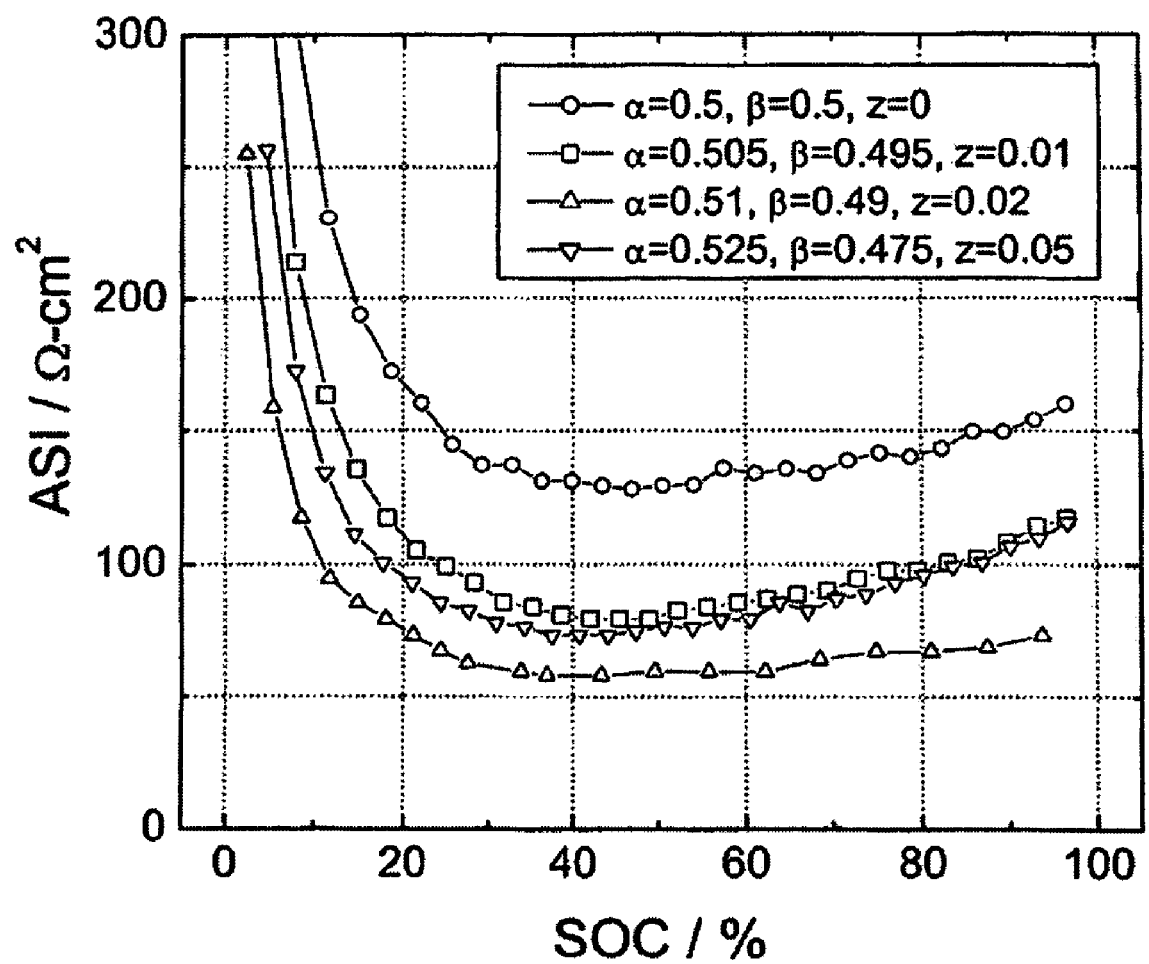
FIG. 7 is a plot showing the area specific impedance of $C/Li(Ni_\alpha Mn_\beta)O_{2-z}F_z$ cells as a function of state of charge measured by 30s-current interruption.
Figure 8:
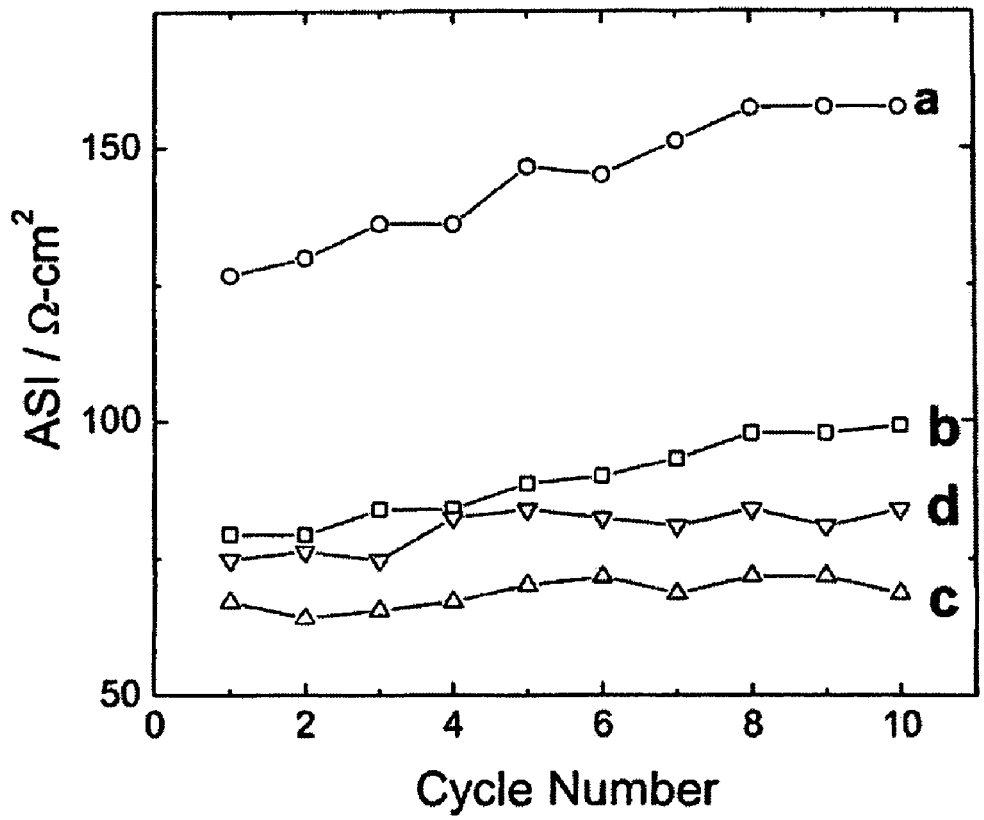
FIG. 8 is a plot showing the variation of the area specific impedance values at 50% state of charge of $C/Li(Ni_\alpha Mn_\beta)O_{2-z}F_z$ cells.

FIG. 7 shows area specific impedance (ASI) of $C/Li(Ni_\alpha Mn_\beta)O_{2-z}F_z$ cells as a function of state of charge (SOC) measured by 30s-current interruption. FIG. 8 shows the variation of the ASI values at 50% SOC of $C/Li(Ni_\alpha Mn_\beta)O_{2-z}F_z$ cells. FIGS. 7 and 8 clearly show that fluorine doping lowers impedance and enhances cycling stability.

Figure 9:
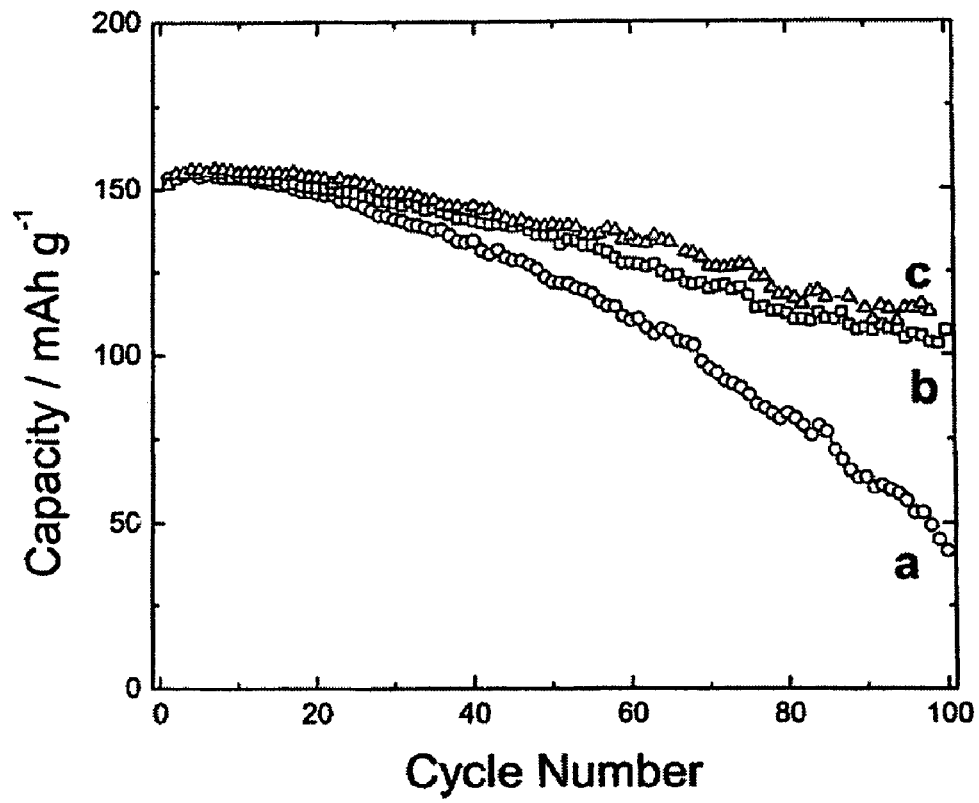
FIGS. 9 and 10 show the cycling performance of uncoated $Li(Ni_\alpha Mn_\beta Co_\gamma)O_2$, $Li(Ni_\alpha Mn_\beta Co_\gamma)O_2$ coated with 0.5 wt % Al-isopropoxide, and $Li(Ni_\alpha Mn_\beta Co_\gamma)O_2$ coated with 1.0 wt % Al-isopropoxide at room temperature and 55° C., respectively.
Figure 10:
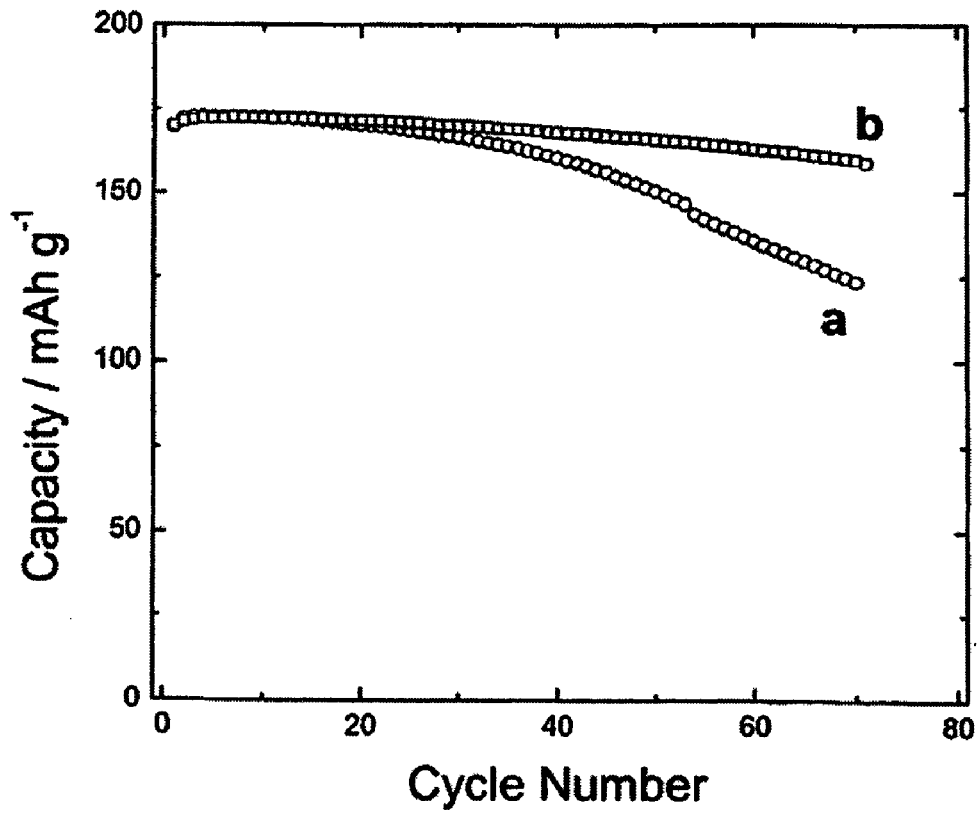

FIGS. 9 and 10 show the cycling performance of uncoated $Li(Ni_\alpha Mn_\beta Co_\gamma)O_2$, $Li(Ni_\alpha Mn_\beta Co_\gamma)O_2$ coated with 0.5 wt % Al-isopropoxide, and $Li(Ni_\alpha Mn_\beta Co_\gamma)O_2$ coated with 1.0 wt % Al-isopropoxide at room temperature and 55° C., respectively. The coating solution is prepared by dissolving appropriate amount of Al-isopropoxide in ethanol. $Li(Ni_\alpha Mn_\beta Co_\gamma)O_2$ powders are then mixed thoroughly with the coating solution and dried at 100° C. for 12 h. The coated powders are subsequently heat-treated at 300° C. for 3 h in air. For FIG. 9, the data identified under group (a), α=0.4, β=0.4, γ=0.2, with the $Li(Ni_\alpha Mn_\beta Co_\gamma)O_2$ uncoated. For the data identified under group (b), α=0.4, β=0.4, γ=0.2, and the $Li(Ni_\alpha Mn_\beta Co_\gamma)O_2$ is coated with 0.5 wt % Al-isopropoxide. For the data identified under group (c), α=0.4, β=0.4, γ=0.2, and the $Li(Ni_\alpha Mn_\beta Co_\gamma)O_2$ is coated with 1.0 wt % Al-isopropoxide. In FIG. 10, for the data identified under group (a), α=0.4, β=0.4, γ=0.2, with the $Li(Ni_\alpha Mn_\beta Co_\gamma)O_2$ uncoated. For the data identified under group (b), α=0.4, β=0.4, γ=0.2, and the $Li(Ni_\alpha Mn_\beta Co_\gamma)O_2$ is coated with 0.5 wt % Al-isopropoxide.

Figure 11:
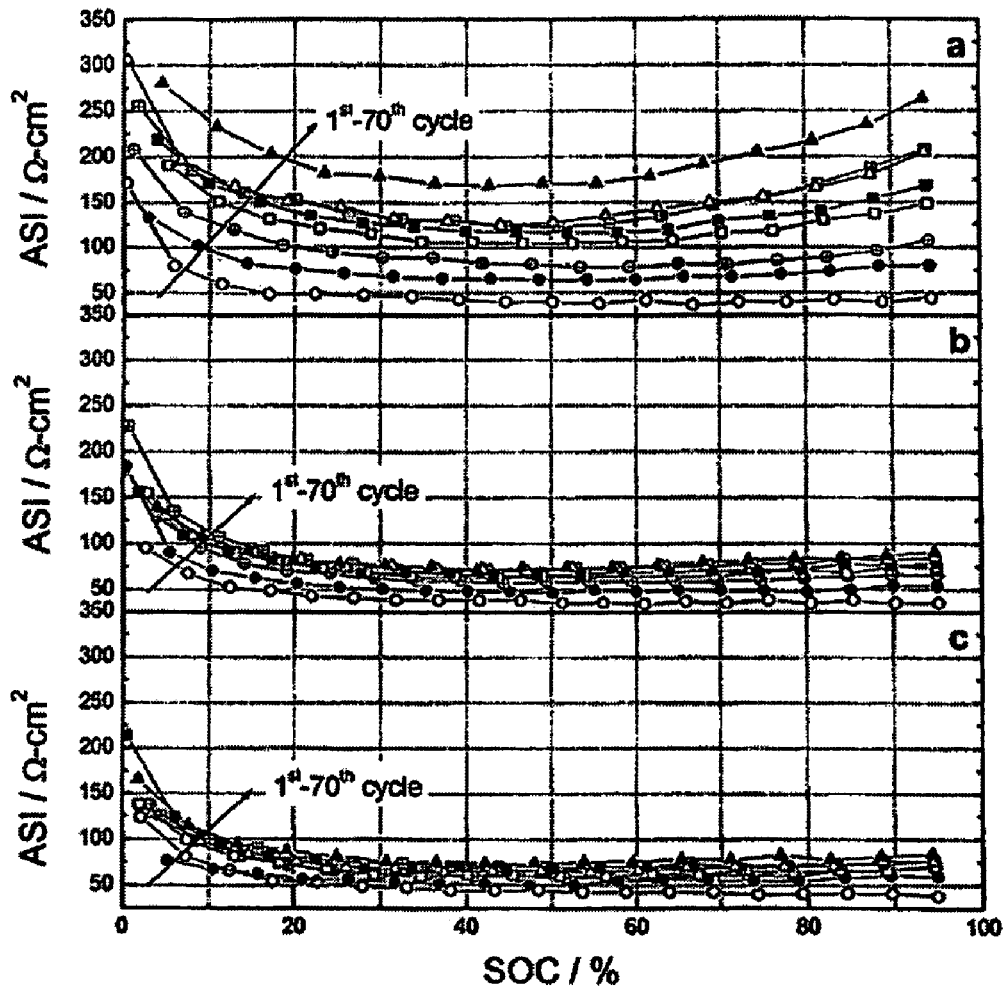
FIG. 11 shows the variation of area specific impedance (ASI) with cycling of C/Li(Ni$_\alpha$Mn$_\beta$Co$_\gamma$)O$_2$ measured by a 30s current interruption method.

FIG. 11 shows the variation of area specific impedance (ASI) with cycling of $C/Li(Ni_\alpha Mn_\beta Co_\gamma)O_2$ measured by a 30s current interruption method with $C/Li(Ni_\alpha Mn_\beta Co_\gamma)O_2$ cells. The cells with coated cathode materials exhibit a very limited increase of ASI, whereas the cells with uncoated cathode material show a large impedance increase with cycling.

Figure 12:
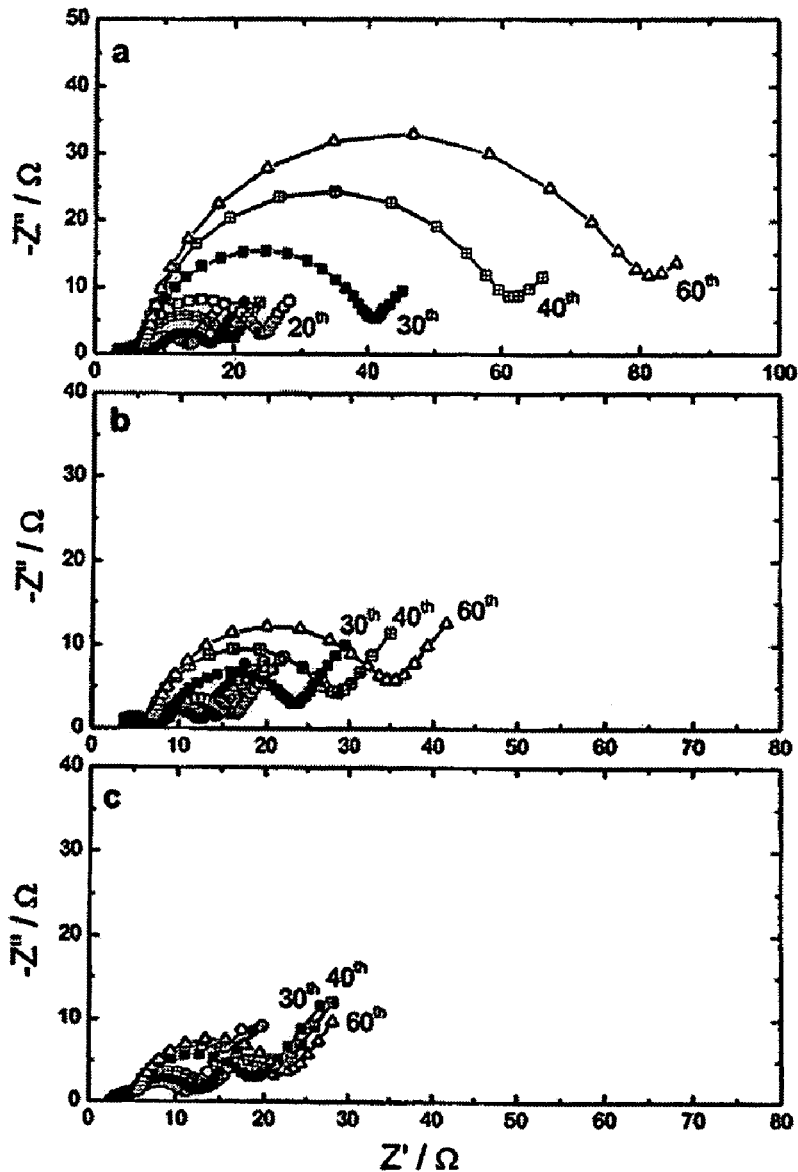
FIG. 12 shows the a.c. impedance spectroscopy of C/Li (Ni$_\alpha$Mn$_\beta$Co$_\gamma$)O$_2$ cells as a function of cycle number measured with C/Li(Ni$_\alpha$Mn$_\beta$Co$_\gamma$)O$_2$ cells.

FIG. 12 shows the a.c. impedance spectroscopy of $C/Li(Ni_\alpha Mn_\beta Co_\gamma)O_2$ cells as a function of cycle number measured with $C/Li(Ni_\alpha Mn_\beta Co_\gamma)O_2$ cells. This representation indicates the surface coating significantly improves the stability of the cathode surface/electrolyte interface. In FIGS. 11 and 12, for the data identified under chart (a), α=0.4, β=0.4, γ=0.2, with the $Li(Ni_\alpha Mn_\beta Co_\gamma)O_2$ uncoated. For the data identified under chart (b), α=0.4, β=0.4, γ=0.2, and the $Li(Ni_\alpha Mn_\beta Co_\gamma)O_2$ is coated with 0.5 wt % Al-isopropoxide. For the data identified under chart (c), α=0.4, β=0.4, γ=0.2, and the $Li(Ni_\alpha Mn_\beta Co_\gamma)O_2$ is coated with 1.0 wt % Al-isopropoxide.

Figure 13:
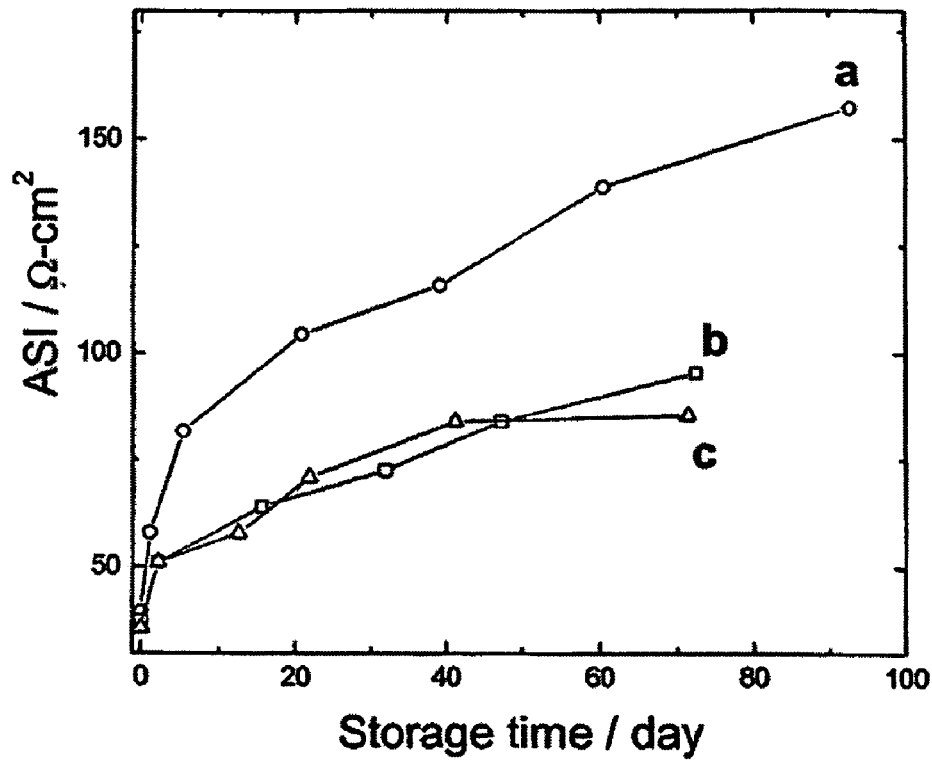
FIG. 13 presents the variation of area specific impedence at 60% SOC with a 55° C.-storage time measured with C/Li (Ni$_\alpha$Mn$_\beta$Co$_\gamma$)O$_2$ cells.

FIG. 13 presents the impedance variation with a 55° C.-storage time measured with $C/Li(Ni_\alpha Mn_\beta Co_\gamma)O_2$ cells. For the data identified under group (a), α=0.4, β=0.4, γ=0.2, with the $Li(Ni_\alpha Mn_\beta Co_\gamma)O_2$ uncoated. For the data identified under group (b), α=0.4, β=0.4, γ=0.2, and the $Li(Ni_\alpha Mn_\beta Co_\gamma)O_2$ is coated with 0.5 wt % Al-isopropoxide. For the data identified under group (c), α=0.4, β=0.4, γ=0.2, and the $Li(Ni_\alpha Mn_\beta Co_\gamma)O_2$ is coated with 1.0 wt % Al-isopropoxide. FIGS. 9-13 clearly show the surface coating greatly improving the cycle life, as well as calendar life, of the lithium-ion cells.

Figure 14:
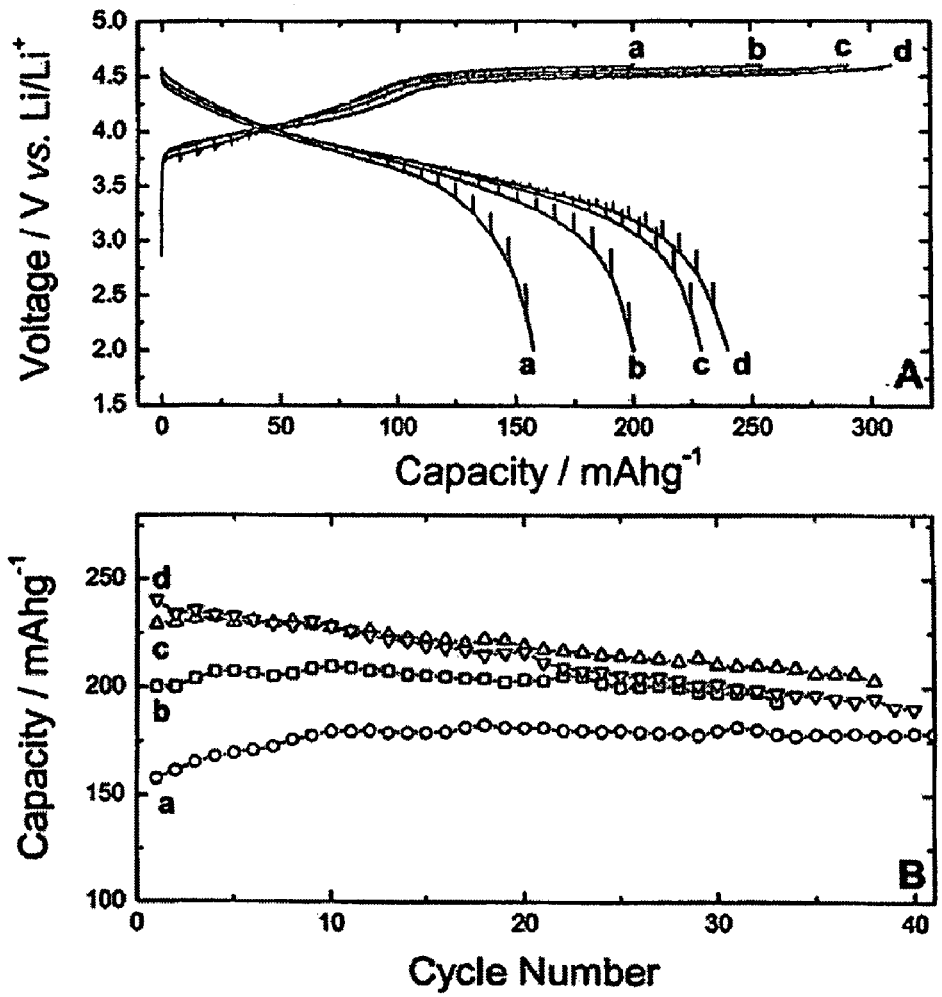
FIG. 14 is a plot showing the first charge/discharge curves and variation of discharge capacity with cycle number of Li/Li$_{1+x}$(Ni$_\alpha$Mn$_\beta$Co$_\gamma$)O$_2$ cells.
Figure 15:
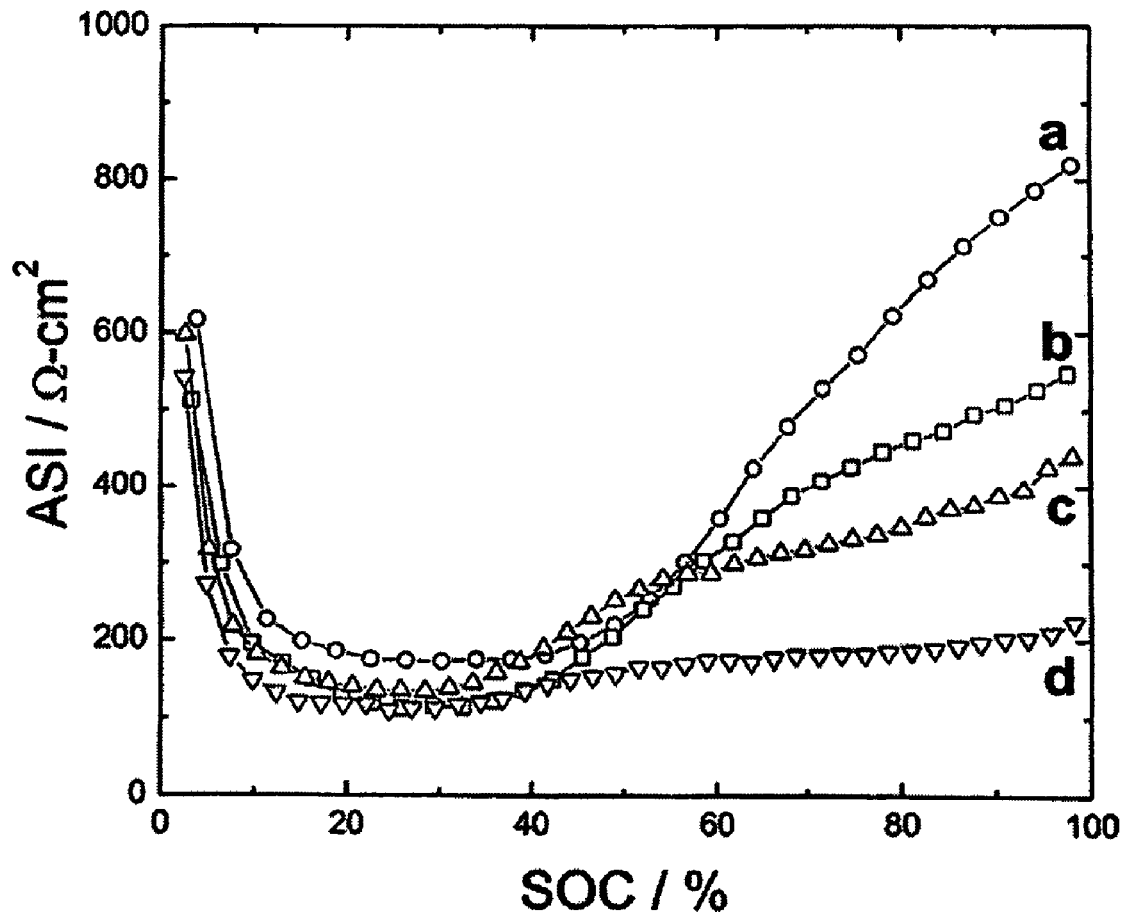
FIG. 15 is a plot showing the area specific impedance of C/Li$_{1+x}$(Ni$_\alpha$Mn$_\beta$Co$_\gamma$)O$_2$ cells as a function of state of charge measured by a 30s current interruption method.

FIG. 14 shows the first charge/discharge curves and variation of discharge capacity with cycle number of $Li/Li_{1+x}(Ni_\alpha Mn_\beta Co_\gamma)O_2$ cells. FIG. 15 shows the area specific impedance of $C/Li_{1+x}(Ni_\alpha Mn_\beta Co_\gamma)O_2$ cells as a function of state of charge measured by a 30s current interruption method.

Figure 16:
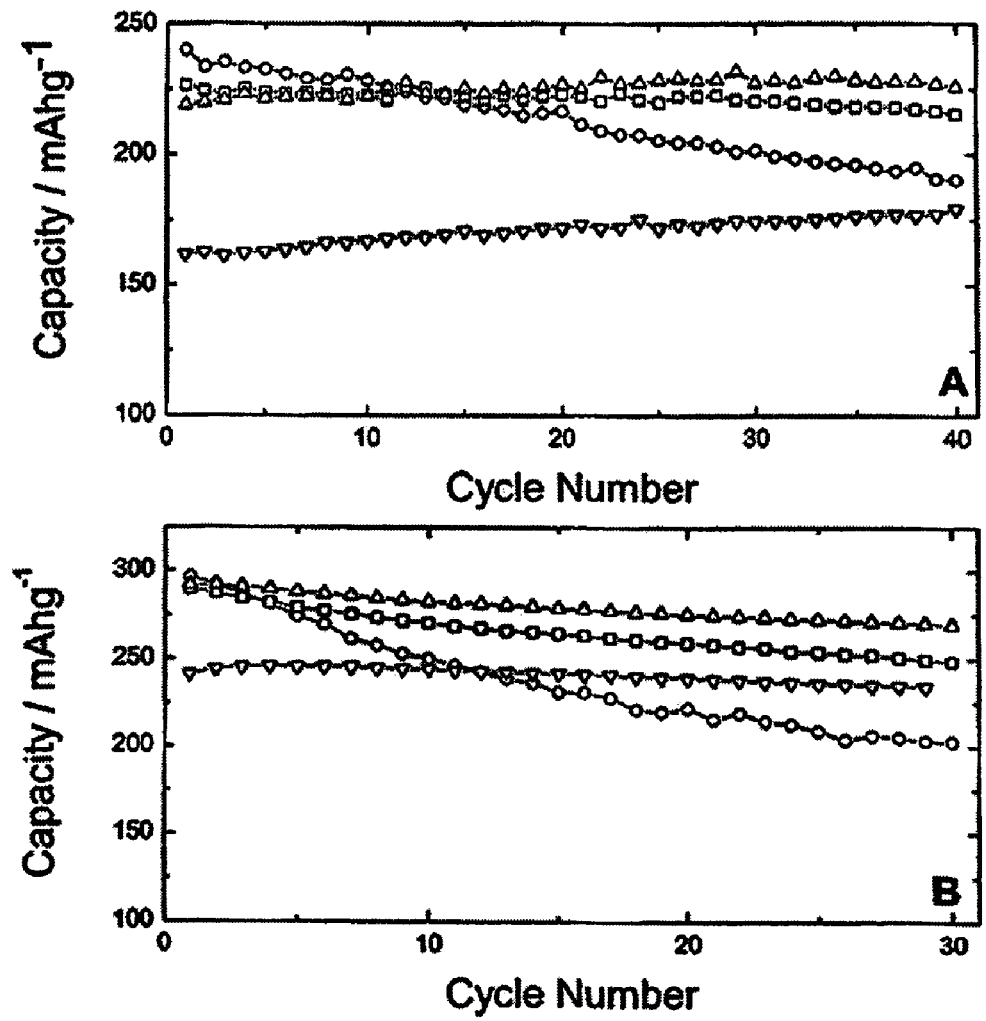
FIG. 16 is a plot showing the cycling performance of Li/Li$_{1+x}$(Ni$_\alpha$Mn$_\beta$Co$_\gamma$)O$_{2-z}$F$_z$ cells at room temperature and at 55° C.
Figure 17:
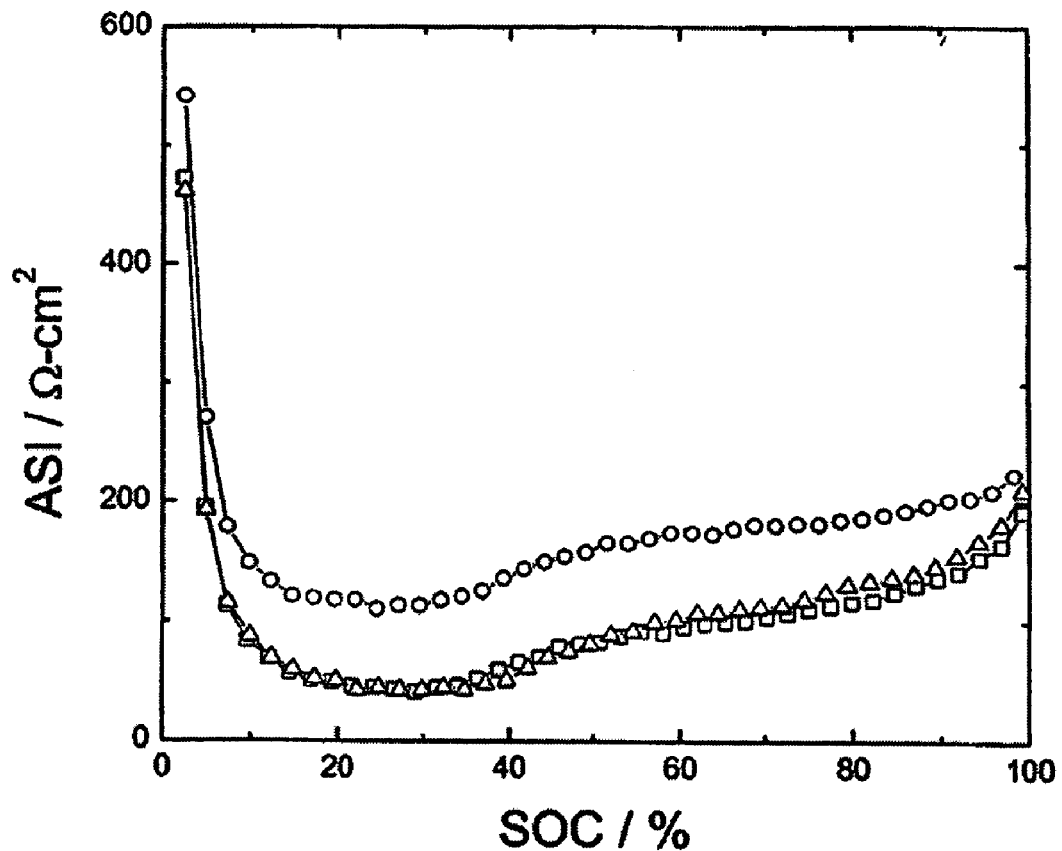
FIG. 17 is a plot showing the area specific impedance of Li/Li$_{1+x}$(Ni$_\alpha$Mn$_\beta$Co$_\gamma$)O$_{2-z}$F$_z$ cells measured by a 30s current interruption method.

FIG. 16 shows cycling performance of $Li/Li_{1+x}(Ni_\alpha Mn_\beta Co_\gamma)O_{2-z}F_z$ cells at room temperature and at 55° C. FIG. 17 shows the area specific impedance of $Li/Li_{1+x}(Ni_\alpha Mn_\beta Co_\gamma)O_{2-z}F_z$ cells measured by a 30s current interruption method.

FIGS. 14-17 clearly show that substitution of oxygen with fluorine significantly improves cycling performance and lowers the impedance of the cathode materials.

Another aspect of the present invention relates to a method for preparing spherical, mixed nickel-cobalt-manganese carbonates with a narrow size distribution and a method for preparing spherical lithium nickel cobalt manganese oxide using the spherical precursors, a coprecipitation method is used to prepare the spherical precursors, $(Ni_a Co_b Mn_c)CO_3$, where the a is between 0 and 1, the b between 0 and 1, and the c between 0 and 1. Ammonium hydrogen carbonate ($NH_4HCO_3$) or sodium carbonate ($Na_2CO_3$) is used for precipitating agents for the coprecipitation. Using the spherical $(Ni_\alpha Co_\beta Mn_\gamma)CO_3$, spherical lithium metal oxides with composition $Li_{1+x}Ni_\alpha Co_\beta Mn_\gamma M'_\delta O_y F_z$ (M'=Mg,Zn,Al,Ga,B,Zr,Ti) are created, where the x is between 0 and about 0.2, the α between 0 and about 1, the β between 0 and about 1, the γ between 0 and about 2, the δ between about 0 and about 0.2, the y is between about 2 and about 4, z is between 0 and about 0.5.

The spherical $(Ni_a Co_b Mn_c)CO_3$ is prepared by coprecipitation as follows. Appropriate amounts of Ni-acetate (or Ni-nitrate or Ni-sulfate), Co-acetate (or Co-nitrate or Co-sulfate), and Mn-acetate (or Mn-nitrate or Ni-sulfate) are dissolved in distilled water and the metal solution is added to another aqueous solution of ammonium hydrogen carbonate or sodium carbonate. The concentration of metal solutions ([Me]) is varied from about 0.01M to about 2M; the concentrations of ammonium hydrogen carbonate solution ([AHC]) or sodium carbonate ([SC]) is varied from about 0.1M to about 5M. The pH of the ammonium hydrogen carbonate solution or the sodium carbonate solution is varied from about 7 to about 12 using ammonium hydroxide or sodium hydroxide. The reaction temperature is varied from about 20° C. to about 65° C. When the metal solution is added to the ammonium hydrogen carbonate solution, the precipitates form instantly. The precipitates are then aged in the solution at each temperature from about 1 h to about 24 h. All of the precipitation reaction and aging are carried out under constant stirring. After aging, the coprecipitated powders are filtered and dried.

To prepare a $Li_{1+x}Ni_\alpha Co_\beta Mn_\gamma M'_\delta O_y F_z$ (M'=Mg,Zn,Al,Ga, B,Zr,Ti) compound, appropriate amounts of lithium hydroxide (or lithium carbonate or lithium nitrate), $(Ni_a Co_b Mn_c)CO_3$, M'-hydroxides (or M'-carbonates or M'-oxides), and LiF (or $NH_4F$) are mixed. The mixed powers are calcined at about 450° C. to about 700° C. for about 12-30 hours either in air or in oxygen atmospheres and then at about 700° C. to about 1000° C. for about 10-24 hours either in air or in oxygen atmospheres.

In one exemplary embodiment, the synthesized compound $Li_{1+x}Ni_\alpha Co_\beta Mn_\gamma M'_{67}O_y F_z$ is mixed with a carbon additive and a PVDF binder to form a laminate film on aluminum foil. This laminate is used, for example, in electrochemical testing in the presence of lithium or carbon counter electrode and non-aqueous electrolyte made of $LiPF_6$/ED:DEC (1:1).

Figure 18B:
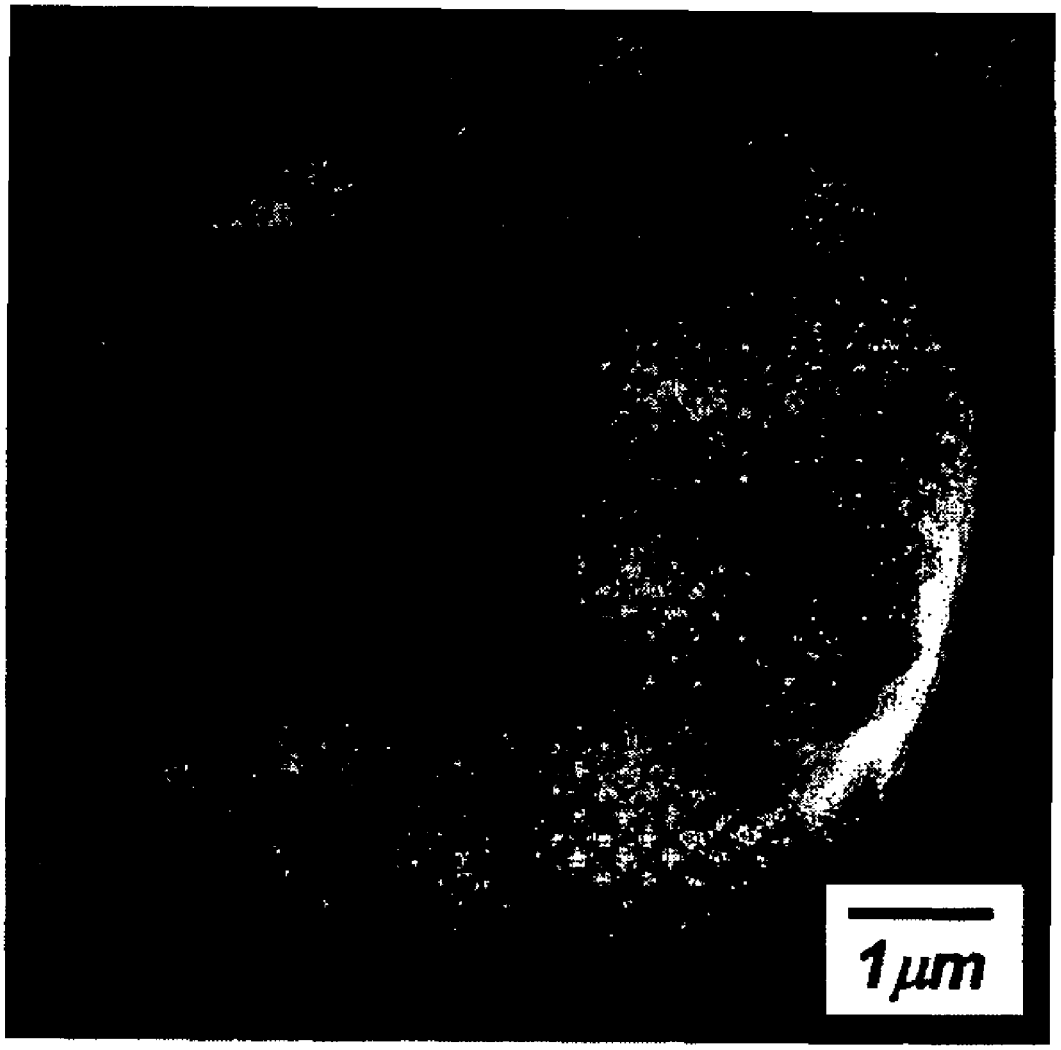
FIG. 18 shows scanning electron microscope (SEM) images of (Ni$_{1/3}$Co$_{1/3}$Mn$_{1/3}$)CO$_3$ precipitates with the concentration of metal solutions [Me] and of ammonium hydrogen carbonate solution [AHC] at 0.1 and 1.0M respectively; the reaction temperature (T$_R$) and the aging time (t$_a$) 65° C. and 17 h, respectively.

FIG. 18 shows SEM images of $(Ni_{1/3}Co_{1/3}Mn_{1/3})CO_3$ precipitates. The a metal solution and ammonium hydrogen carbonate (AHC) concentrations were 0.1 and 1.0M respectively; the reaction temperature ($T_R$) and the aging time ($t_a$) were 65° C. and 17 h, respectively. It can be seen in FIG. 18 that the carbonate precipitates have a spherical morphology with a mean particle size (D50) of about 5-6 μm and a very narrow size distribution of about 1 to 50 microns.

Figure 19A:
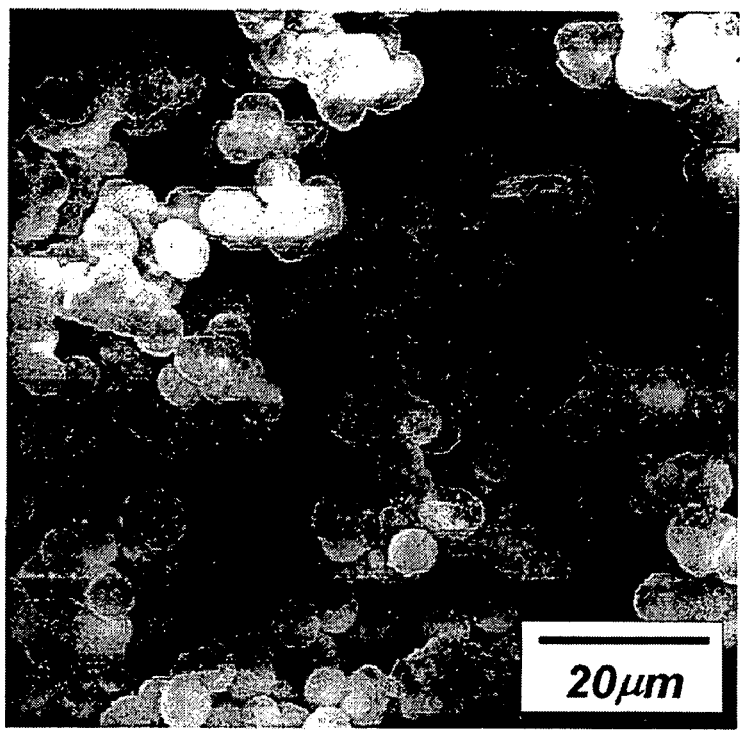
FIG. 19(a) shows SEM images of (Ni$_{1/3}$Co$_{1/3}$Mn$_{1/3}$)CO$_3$ precipitates prepared with [Me]=0.05M, [AHC]=0.5M, T$_R$=65° C., t$_a$=17 h; and 19(b) shows SEM images of (Ni$_{1/3}$Co$_{1/3}$Mn$_{1/3}$)CO$_3$ precipitates prepared with [Me]=0.2M, [AHC]=2.0M, T$_R$=65° C., t$_a$=4 h.
Figure 19B:
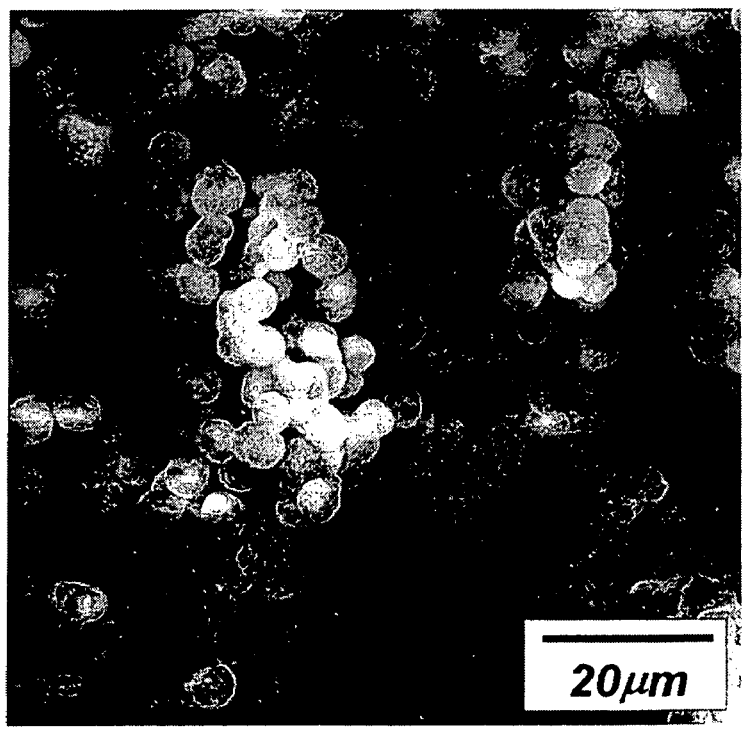

FIG. 19 shows additional SEM images of $(Ni_{1/3}Co_{1/3}Mn_{1/3})CO_3$, prepared by different methods. FIG. 19(a) shows the SEM images of $(Ni_{1/3}Co_{1/3}Mn_{1/3})CO_3$ precipitates prepared with a metal solution of about 0.05M, AHC concentration of about 0.5M, $T_R$=about 65° C., $t_a$=about 17 h; 19(b) shows the SEM images of $(Ni_{1/3}Co_{1/3}Mn_{1/3})CO_3$ precipitates prepared with Me concentration of 0.2M, AHC concentration of 2.0M, $T_R$=about 65° C., $t_a$=about 4 h.

Figure 20A:
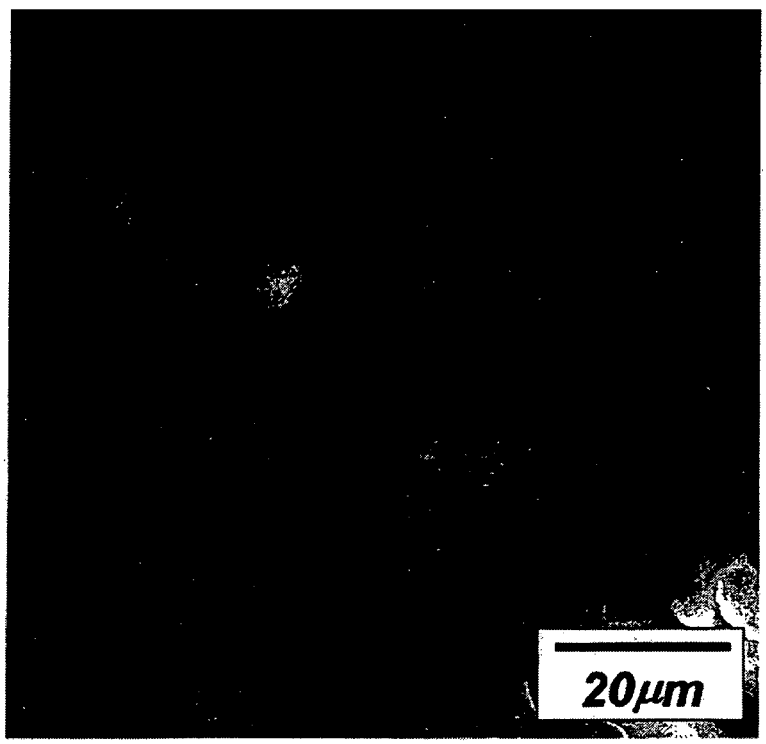
FIGS. 20(a) and 20(b) represent the SEM images of (Ni$_{0.219}$Co$_{0.125}$Mn$_{0.656}$)CO$_3$ precipitates prepared with [Me]=0.1M, [AHC]=1.0M, t$_a$=6 h at different temperatures (20 and 40° C., respectively)
Figure 20B:
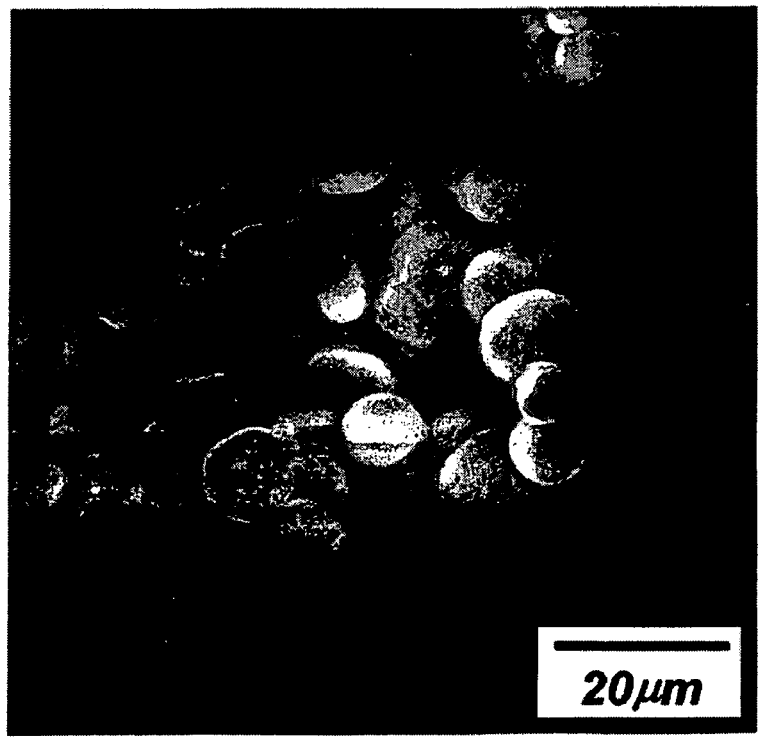

FIGS. 20(a) and 20(b) show the SEM images of $(Ni_{0.219}Co_{0.125}Mn_{0.656})CO_3$ precipitates prepared with a metal solution concentration of 0.1M, AHC concentration of about 1.0M, $t_a$=about 6 h at different temperatures (about 20° C. and about 40° C., respectively).

Figure 21:
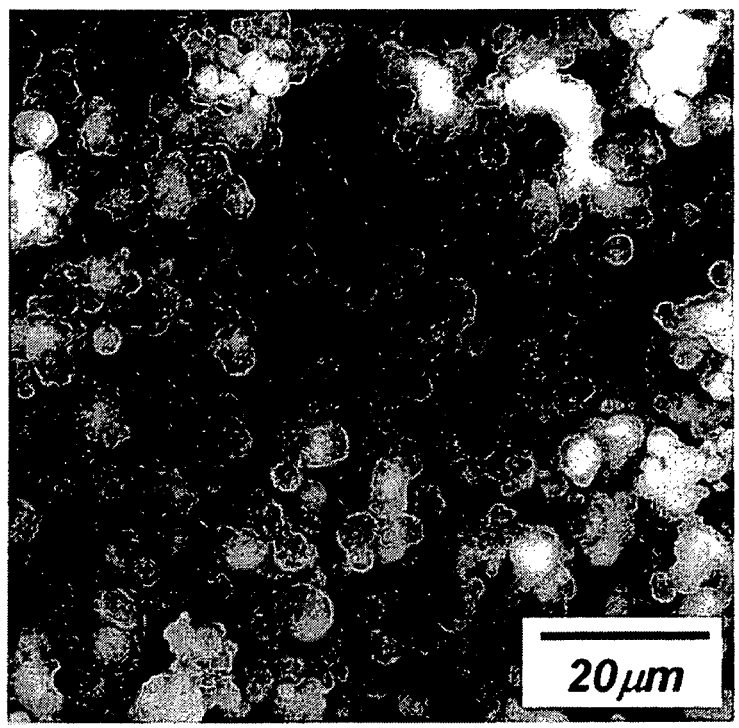
FIG. 21 shows an SEM image of MnCO$_3$ precipitates prepared with [Me]=0.1M, [AHC]=1.0M, T$_R$=55° C., and t$_a$=17 h.

FIG. 21 shows an SEM image of $MnCO_3$ precipitates prepared with a metal solution concentration of about 0.1M, AHC concentration of about 1.0M, $T_R$=about 55° C., and $t_a$=about 17 h.

Figure 22:
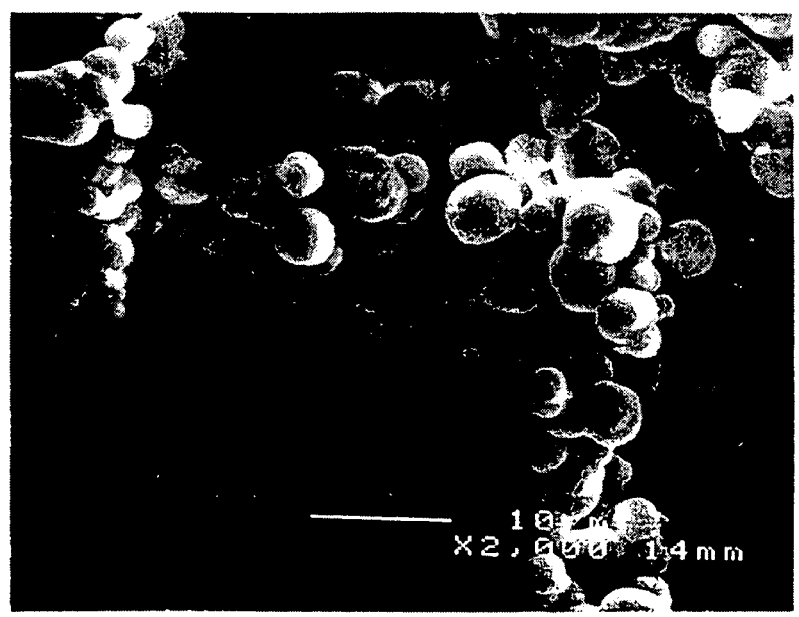
FIG. 22 shows an SEM image of (Co$_{0.5}$Mn$_{0.5}$)CO$_3$ precipitates prepared with [Me]=0.1M, [AHC]=1.0M, T$_R$=50° C., and t$_a$=17 h.

FIG. 22 shows an SEM image of $(Co_{0.5}Mn_{0.5})CO_3$ precipitates prepared with a metal solution concentration of about 0.1M, AHC concentration of about 1.0M, $T_R$=about 50° C., and $t_a$=about 17 h.

Figure 23:
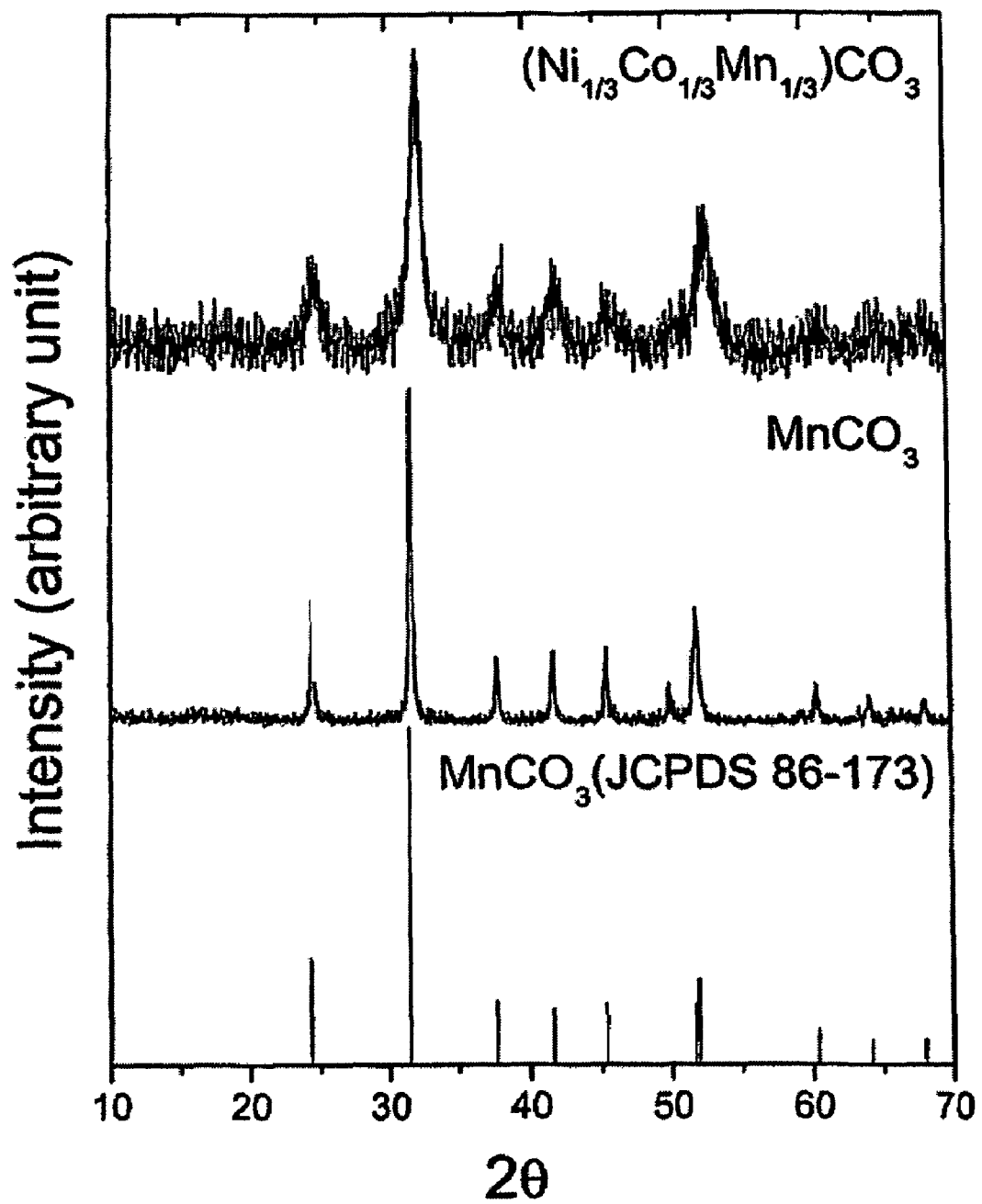
FIG. 23 represents the X-ray diffraction (XRD) patterns of the (Ni$_{1/3}$Co$_{1/3}$Mn$_{1/3}$)CO$_3$ and MnCO$_3$ precipitates shown in FIGS. 18 and 21, respectively, together with the reported XRD patterns of MnCO$_3$ (JCPDS 86-173)

FIG. 23 represents the x-ray diffraction (XRD) patterns of the $(Ni_{1/3}Co_{1/3}Mn_{1/3})CO_3$ and $MnCO_3$ precipitates shown in FIGS. 18 and 21, respectively, together with the reported XRD patterns of $MnCO_3$. The XRD patterns of the coprecipitated materials are well matched with the reported XRD patterns of $MnCO_3$ with rhombohedral structure (space group of R3c).

Figure 24A:
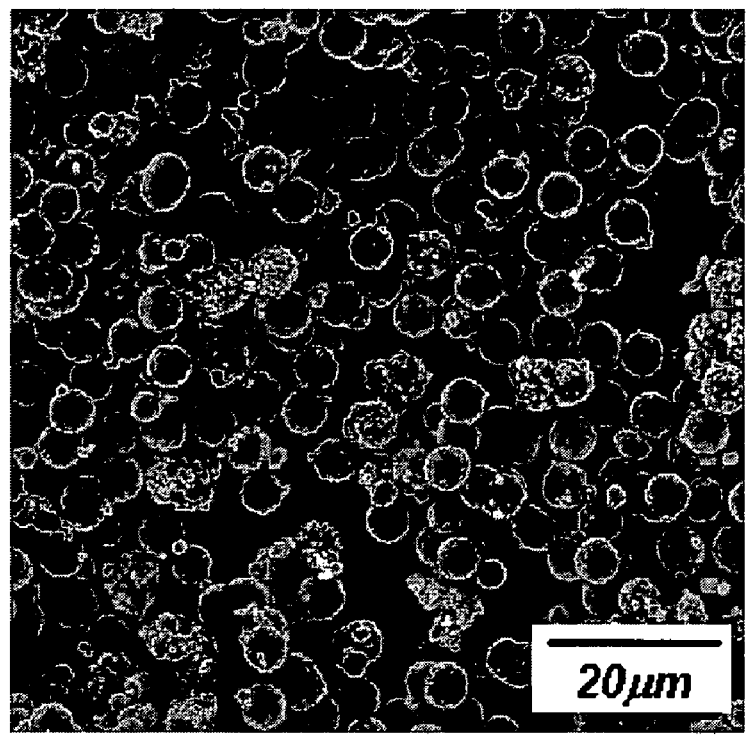
FIG. 24 shows SEM images of Li[Ni$_{1/3}$Co$_{1/3}$Mn$_{1/3}$]O$_2$ prepared using the (Ni$_{1/3}$Co$_{1/3}$Mn$_{1/3}$)CO$_3$ shown in FIG. 18 with calcination carried out at 1000° C. for 10 h in air.
Figure 24B:
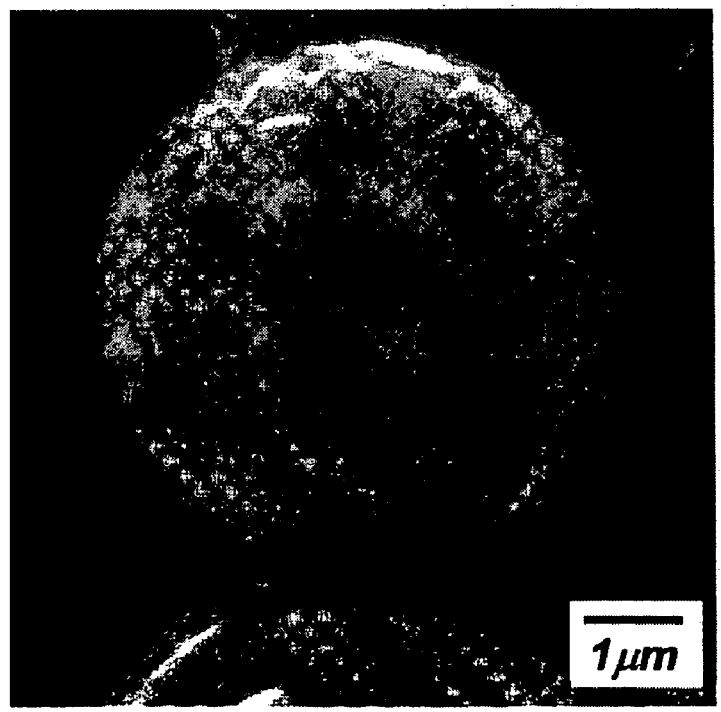

FIG. 24 shows the SEM images of $Li[Ni_{1/3}Co_{1/3}Mn_{1/3}]O_2$ prepared using the $(Ni_{1/3}Co_{1/3}Mn_{1/3})CO_3$ shown in FIG. 18. The calcinations were carried out at about 1000° C. for about 10 h in air. It can be seen in FIG. 24 that the $Li[Ni_{1/3}Co_{1/3}Mn_{1/3}]O_2$ material retained the size and morphology of the $(Ni_{1/3}Co_{1/3}Mn_{1/3})CO_3$ precursor.

Figure 25:
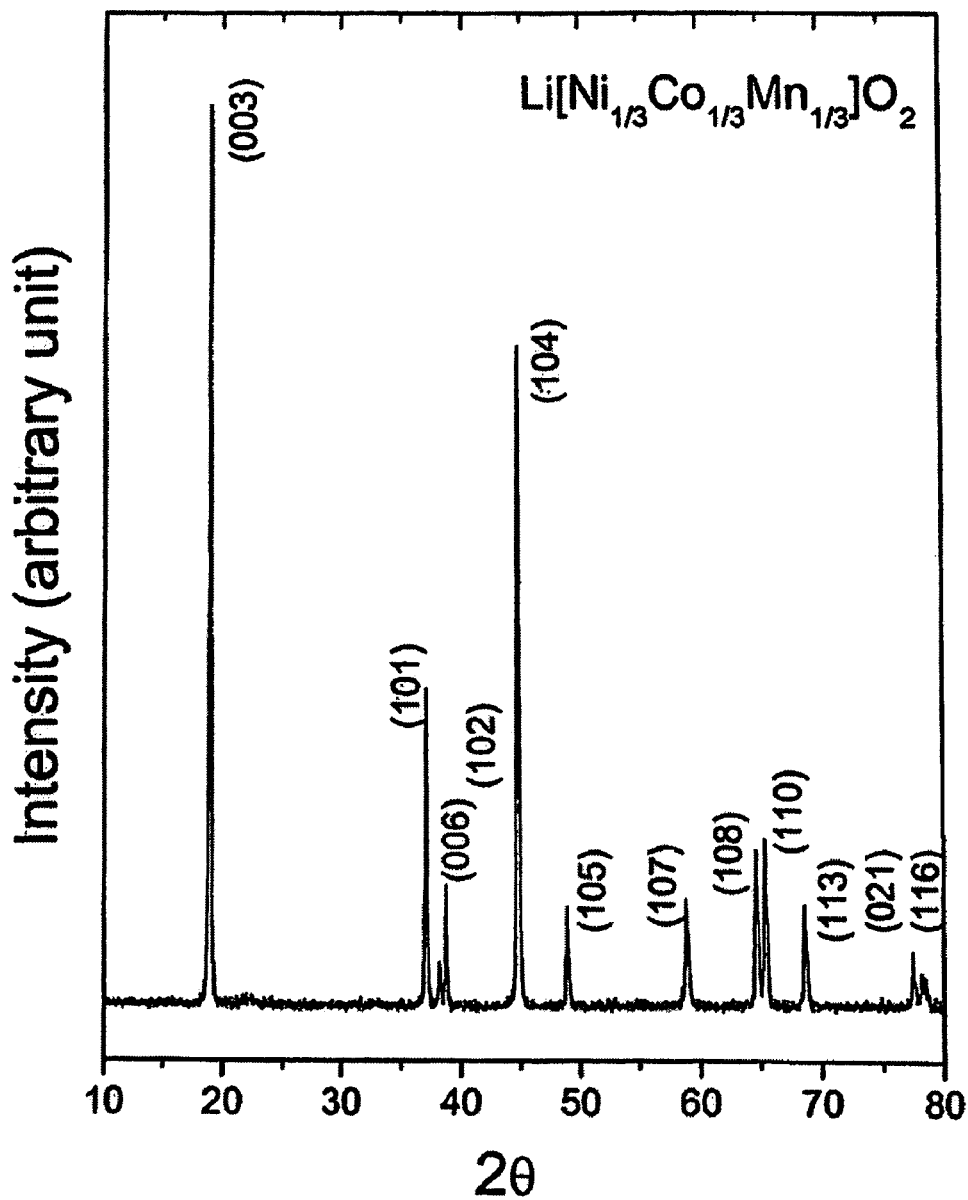
FIG. 25 represents the XRD patterns of the Li[Ni$_{1/3}$Co$_{1/3}$Mn$_{1/3}$]O$_2$ material shown in FIG. 24.

FIG. 25 represents the XRD patterns of the $Li[Ni_{1/3}Co_{1/3}Mn_{1/3}]O_2$ material shown in FIG. 24. The material exhibits the ordered rock-salt structure with crystallographic structure of R3m.

Figure 26:
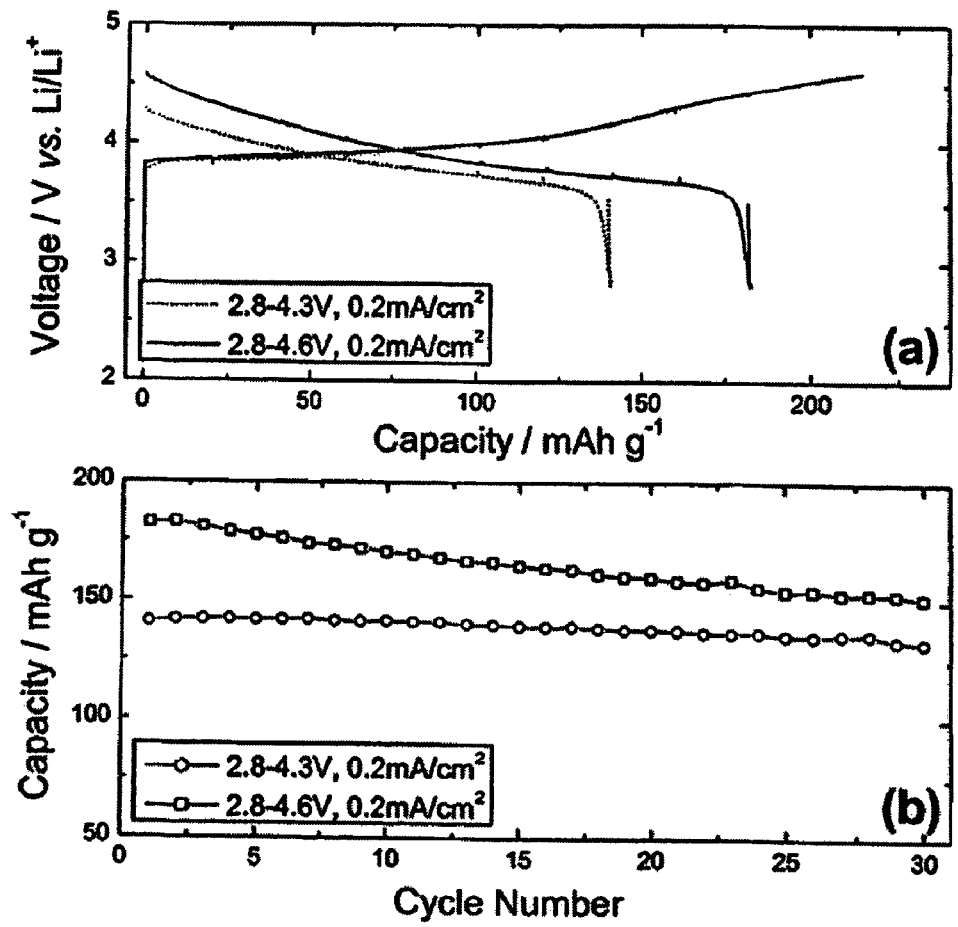
FIGS. 26(a) and 26(b) show the first charge/discharge curves of the Li/Li[Ni$_{1/3}$Co$_{1/3}$Mn$_{1/3}$]O$_2$ cells cycled in the voltage range of 2.8-4.6V and the variation of the discharge capacities as a function of cycle number, respectively.

FIGS. 26(a) and 26(b) show the first charge/discharge curves of the $Li/Li[Ni_{1/3}Co_{1/3}Mn_{1/3}]O_2$ cells cycled in the voltage range of 2.8-4.6V and the variation of the discharge capacities as a function of cycle number, respectively.

The materials described herein can be used as cathodes in lithium-ion rechargeable batteries for products such as electric vehicles, hybrid electric vehicles, portable electronics, and a variety of other products. The materials described herein are less expensive and thermally safer than existing cathode materials such as $LiCoO_2$ and $LiNiO_2$. The materials of the present invention also exhibit improved calendar/cycle life when compared to existing cathode materials.

It should be understood that the above description of the invention and specific examples and embodiments, while indicating the preferred embodiments of the present invention, are given by demonstration and not limitation. Many changes and modifications within the scope of the present invention may therefore be made without departing from the spirit thereof and the present invention includes all such changes and modifications.

What is claimed is:

1. A method of preparing a mixed nickel-cobalt-manganese carbonate comprising the steps of:
    dissolving in distilled water about 0.01M to about 2M of a metal solution comprising:
        a nickel compound selected from the group consisting of Ni-acetate, Ni-nitrate, Ni-sulfate and combinations thereof;
        a cobalt compound selected from the group consisting of Co-acetate, Co-nitrate, Co-sulfate, and combinations thereof; and
        a manganese compound chosen from the group consisting of Mn-acetate, Mn-nitrate, Mn-sulfate, and combinations thereof;
    adding the metal solution to an aqueous solution of about 0.1M to about 5M of a carbonate chosen from the group consisting of ammonium hydrogen carbonate, sodium carbonate and combinations thereof;
    aging the precipitates in the solution at a temperature increased from about 20° C. to about 65° C. wherein the solution is reacted at each temperature for about 1 h to about 24 h.

2. The method of preparing a mixed nickel-cobalt-manganese carbonate of claim 1, wherein the steps of reacting and aging are carried out with constant stirring.

3. The method of preparing a mixed nickel-cobalt-manganese carbonate of claim 1 further comprising the steps of, after aging, filtering and drying the coprecipitate powders.

4. The method of preparing a mixed nickel-cobalt-manganese carbonate of claim 1, wherein the carbonate solution has a pH which is varied from about 7 to about 10 using a hydroxide selected from the group consisting of ammonium hydroxide, sodium hydroxide, and combinations thereof.

* * * * *